United States Patent
Sasaki et al.

(10) Patent No.: US 8,059,511 B2
(45) Date of Patent: Nov. 15, 2011

(54) DEVICE AND METHOD FOR REPRODUCING INFORMATION, AND COMPUTER PROGRAM

(75) Inventors: Yoshio Sasaki, Tokorozawa (JP); Shogo Miyanabe, Higashiyamato (JP); Hiroyuki Uchino, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 186 days.

(21) Appl. No.: 12/517,427

(22) PCT Filed: Dec. 5, 2006

(86) PCT No.: PCT/JP2006/324278
§ 371 (c)(1),
(2), (4) Date: Jul. 23, 2009

(87) PCT Pub. No.: WO2008/068853
PCT Pub. Date: Jun. 12, 2008

(65) Prior Publication Data
US 2010/0080099 A1    Apr. 1, 2010

(51) Int. Cl.
*G11B 20/10*    (2006.01)
(52) U.S. Cl. ............... 369/59.22; 369/59.17; 369/47.44
(58) Field of Classification Search ............... 369/47.14, 369/47.53, 59.22, 59.17, 47.44, 59.15; 386/269; 360/39; 375/341
See application file for complete search history.

(56) References Cited

U.S. PATENT DOCUMENTS

| | | | | |
|---|---|---|---|---|
| 4,736,257 A * | 4/1988 | Watanabe et al. | ............. | 386/269 |
| 6,272,105 B1 * | 8/2001 | Hayashi | ............. | 369/275.3 |
| 6,335,913 B1 * | 1/2002 | Okamoto | ............. | 369/59.22 |
| 2002/0013927 A1 | 1/2002 | Hayami et al. | | |
| 2003/0063406 A1 * | 4/2003 | Takeo | ............. | 360/39 |
| 2004/0076245 A1 * | 4/2004 | Okamoto et al. | ............. | 375/341 |
| 2005/0063276 A1 * | 3/2005 | Ogura | ............. | 369/59.22 |
| 2005/0180287 A1 * | 8/2005 | Lee et al. | ............. | 369/59.15 |
| 2005/0219985 A1 | 10/2005 | Nakahira | | |
| 2006/0203646 A1 * | 9/2006 | Oyama et al. | ............. | 369/47.53 |
| 2006/0280108 A1 * | 12/2006 | Hoshizawa | ............. | 369/275.3 |

FOREIGN PATENT DOCUMENTS

| | | |
|---|---|---|
| JP | 06-005013 | 1/1994 |
| JP | 2001-186027 | 7/2001 |
| JP | 2004-342243 | 12/2004 |
| JP | 2005-093033 | 4/2005 |
| WO | WO2005/024822 | 3/2005 |

OTHER PUBLICATIONS

International Search Report, PCT/JP2006/324278, Mar. 6, 2007.

* cited by examiner

*Primary Examiner* — Thuy Pardo
(74) *Attorney, Agent, or Firm* — Young & Thompson

(57) ABSTRACT

An information reproducing apparatus (1) is provided with: a correcting device (18) for correcting waveform distortion occurring in a read signal corresponding to a long mark, of a read signal ($R_{RF}$) read from a recording medium (100); and a processing device (15) for performing a PRML (Partial Response Maximum Likelihood) process on the read signal in which the waveform distortion is corrected.

16 Claims, 21 Drawing Sheets

[FIG. 1]
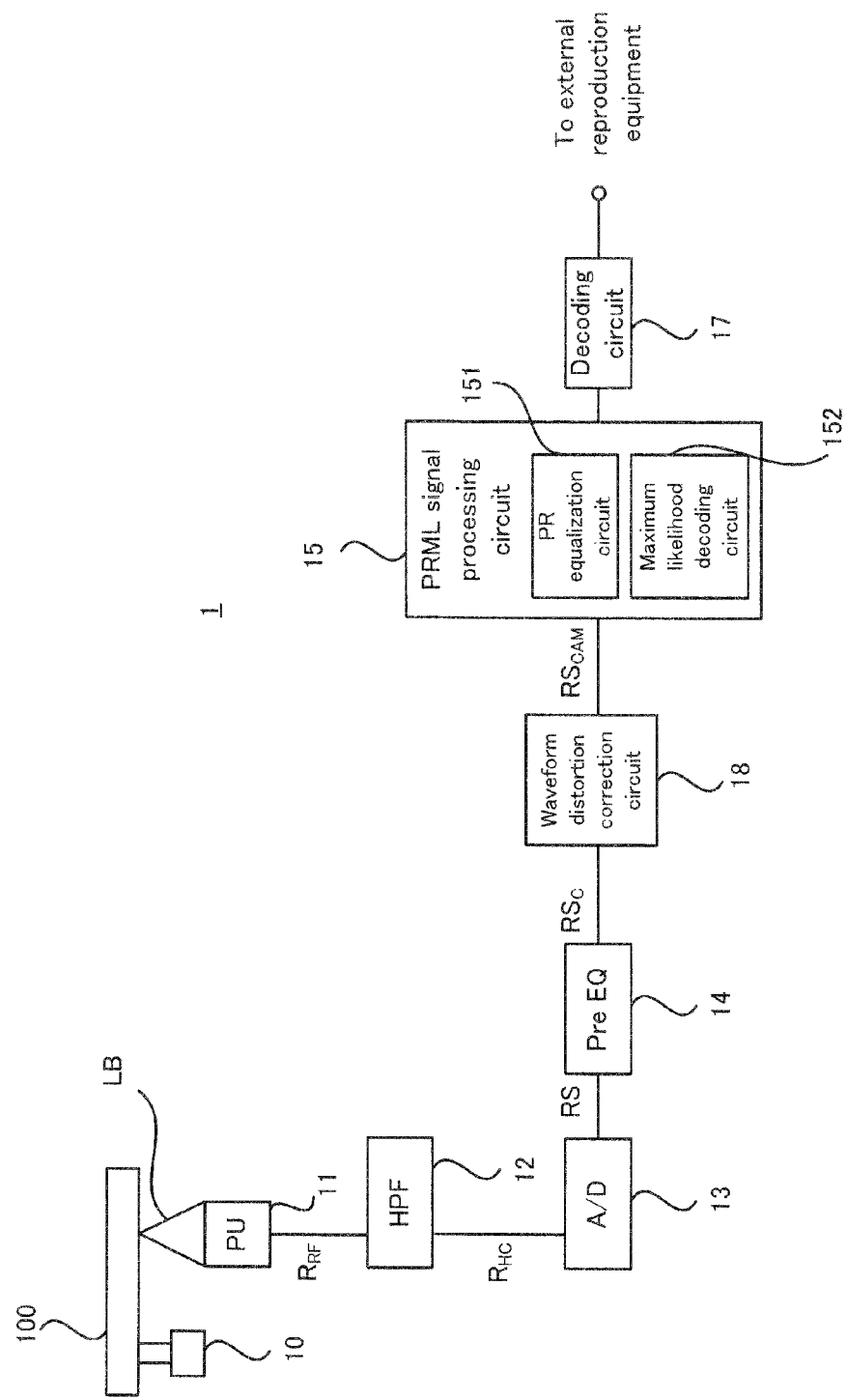

[FIG. 2]
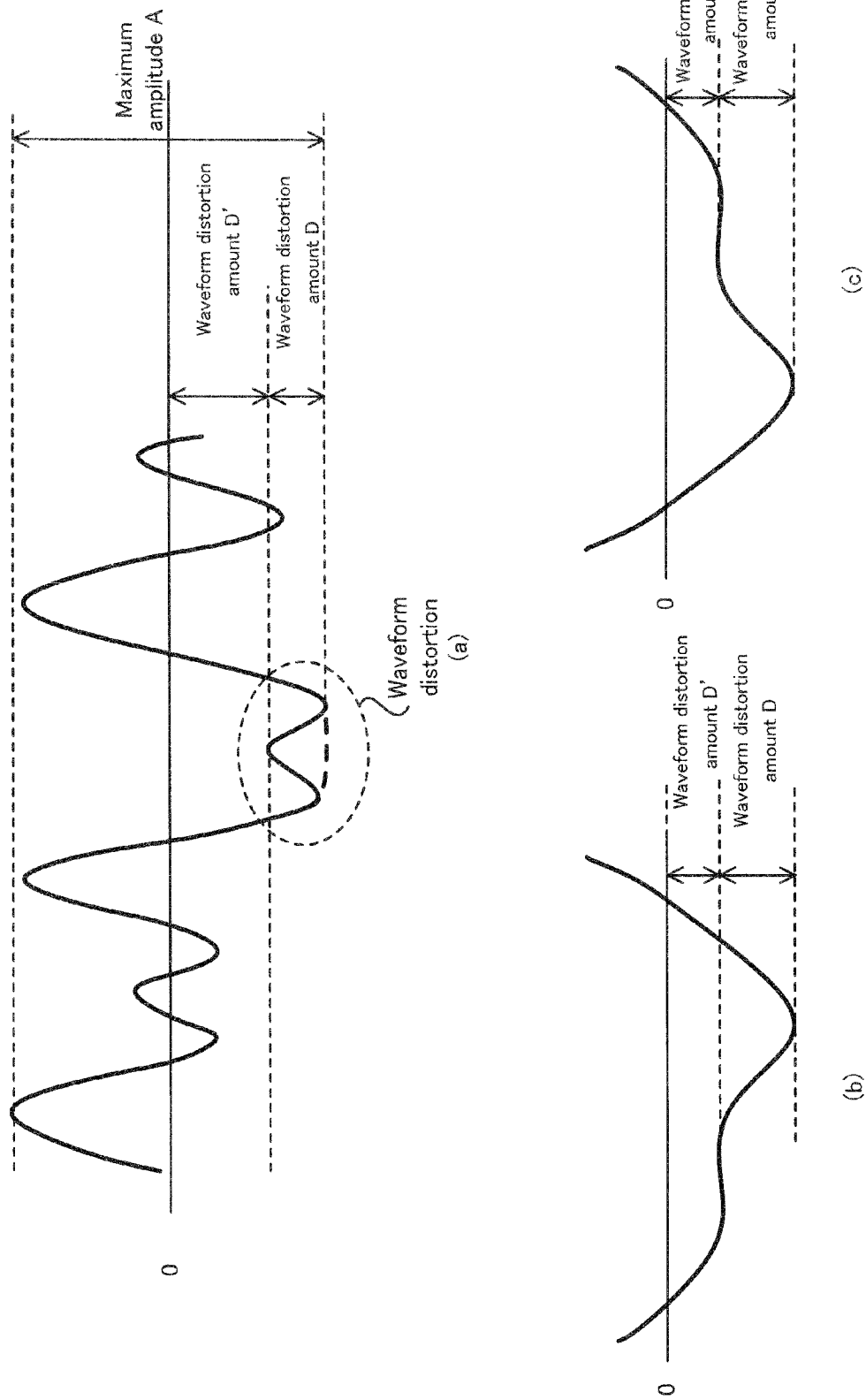

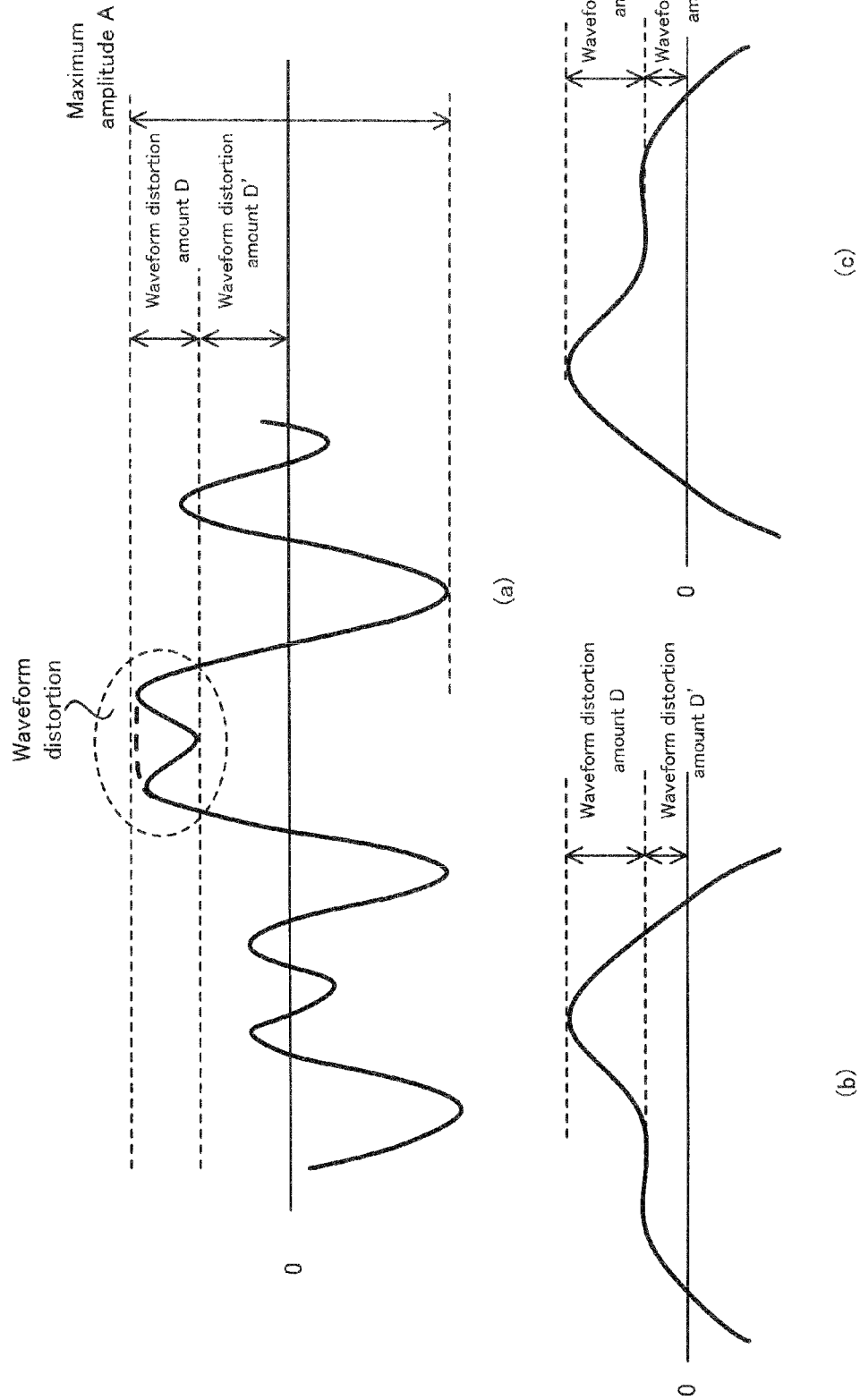
[FIG. 3]

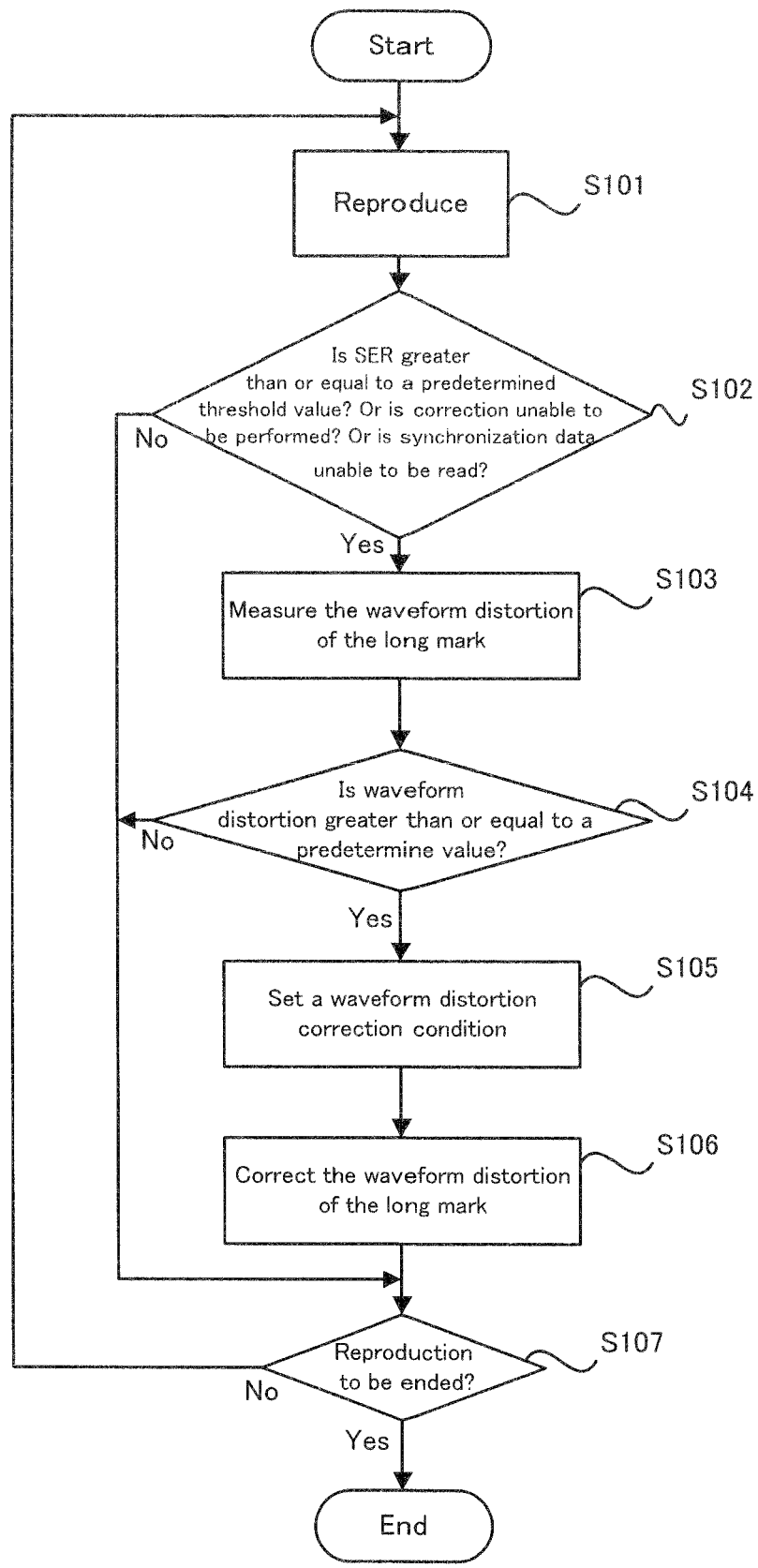
[FIG. 4]

[FIG. 5]
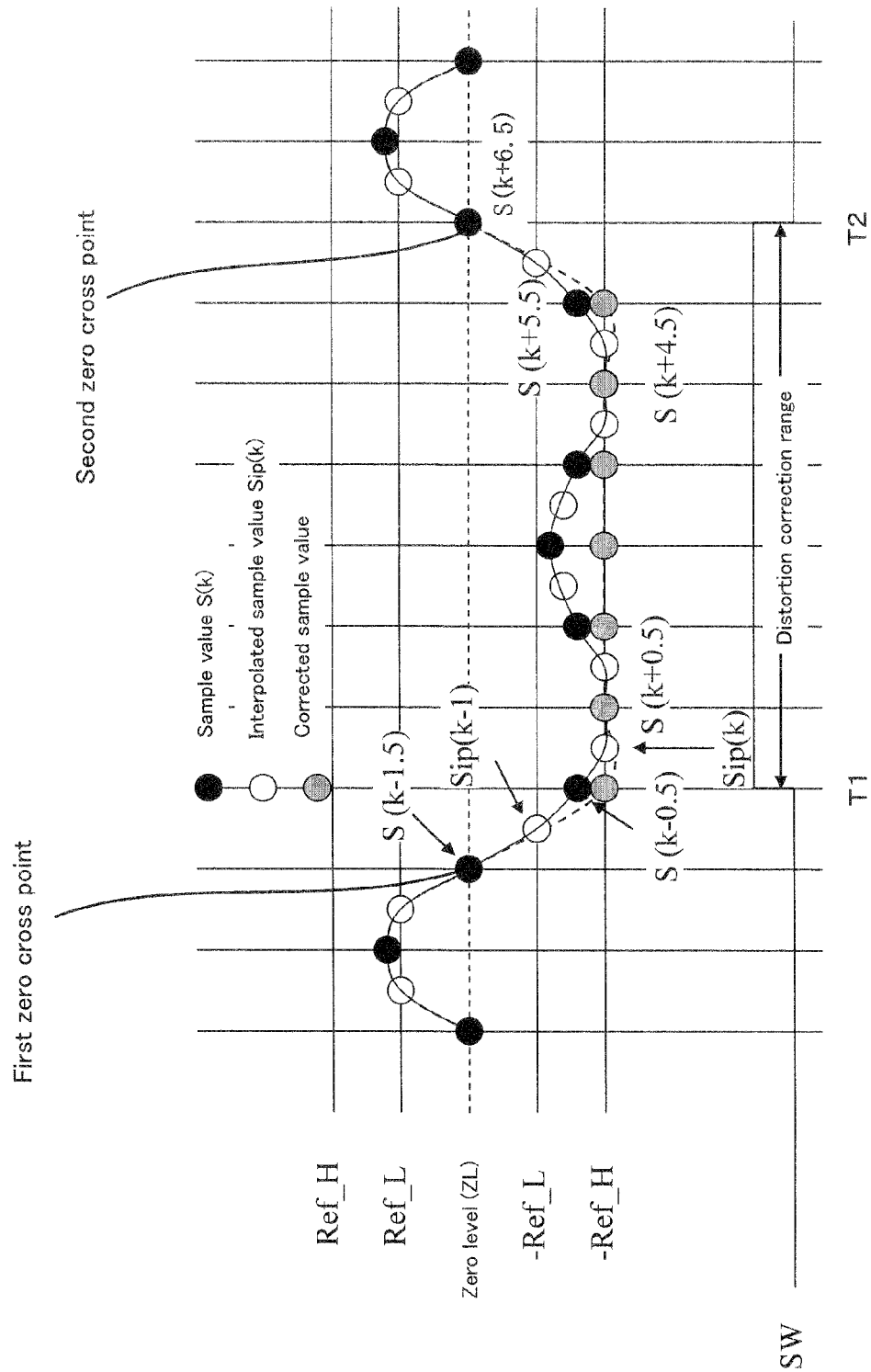

[FIG. 6]
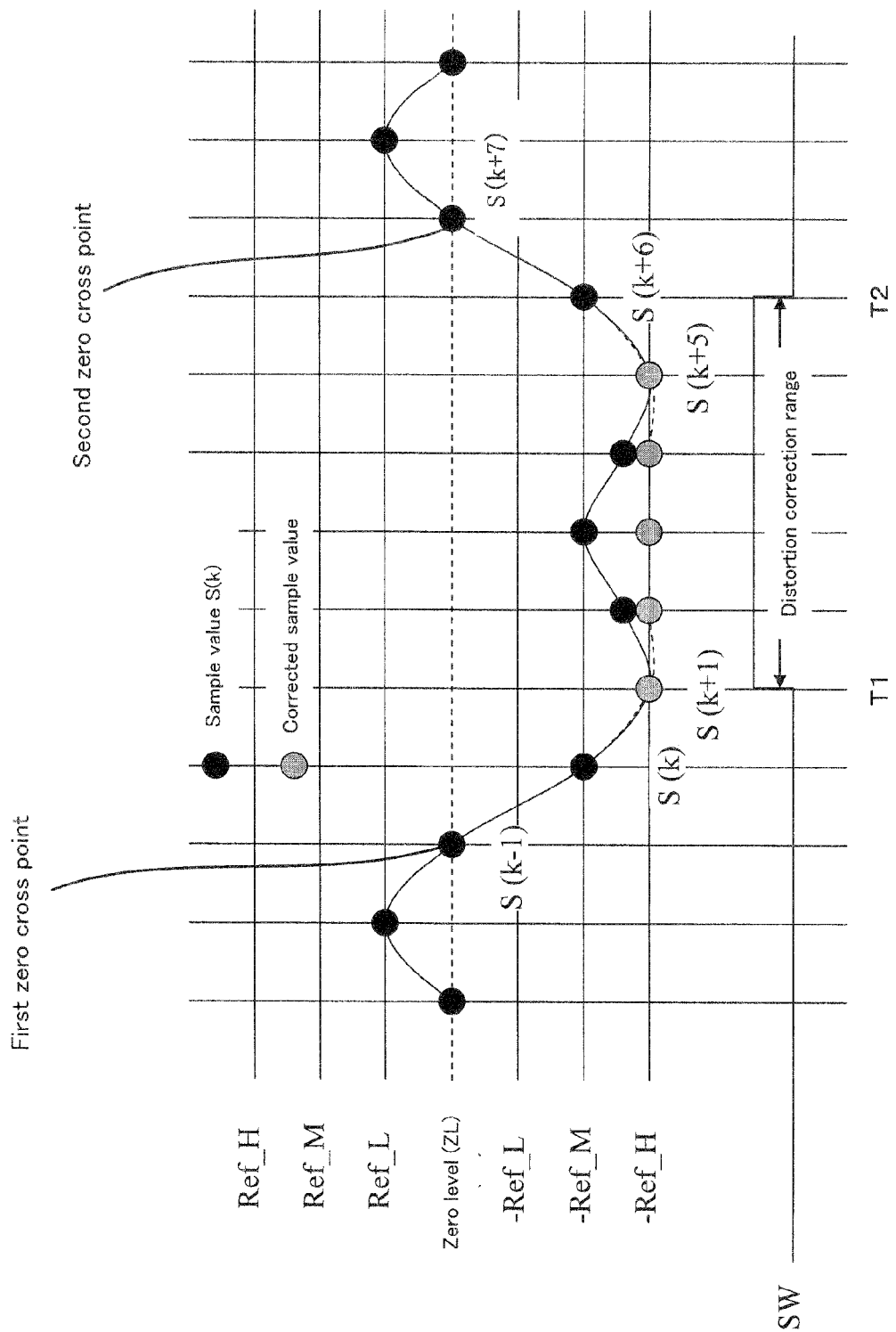

[FIG. 7]
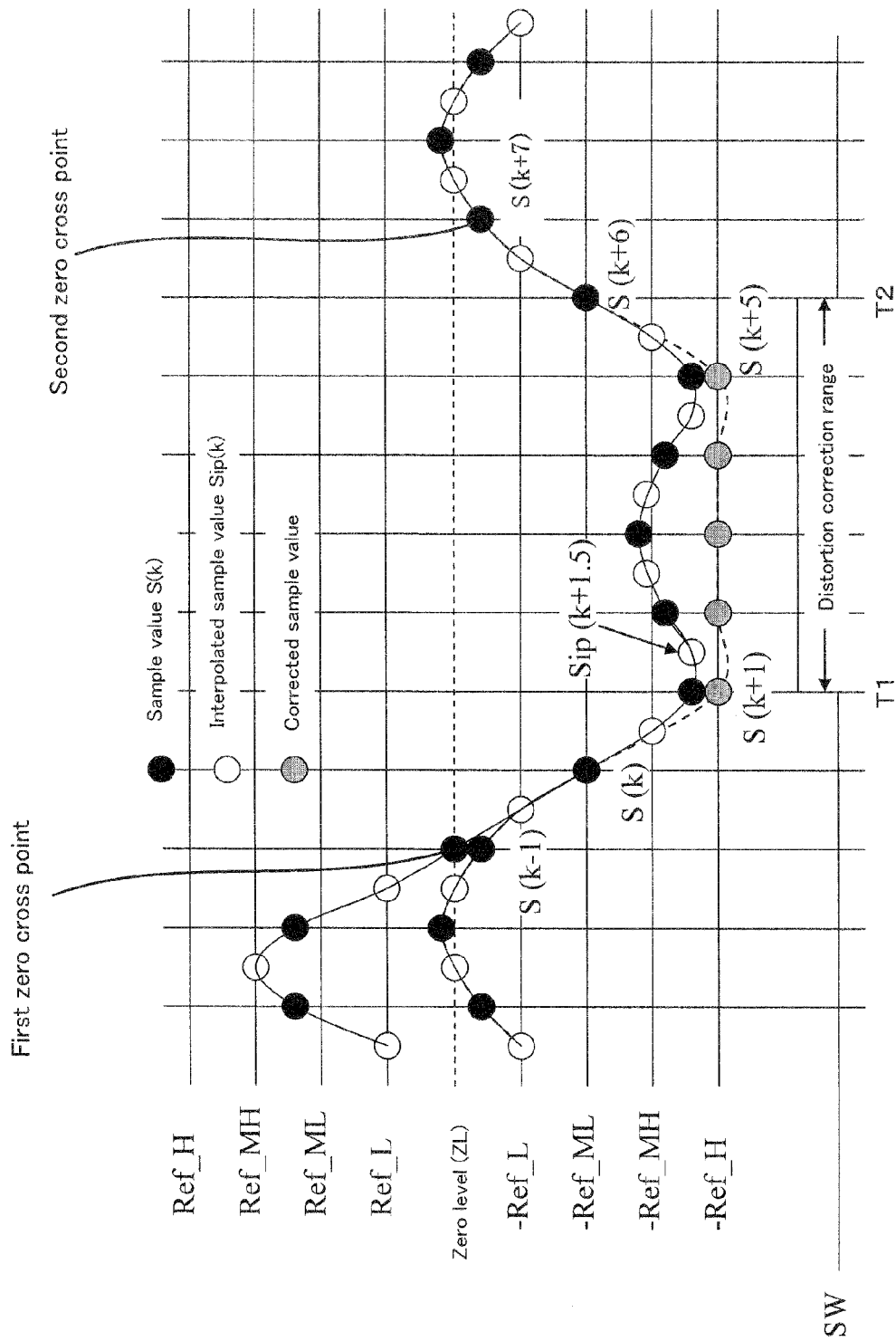

[FIG. 8]
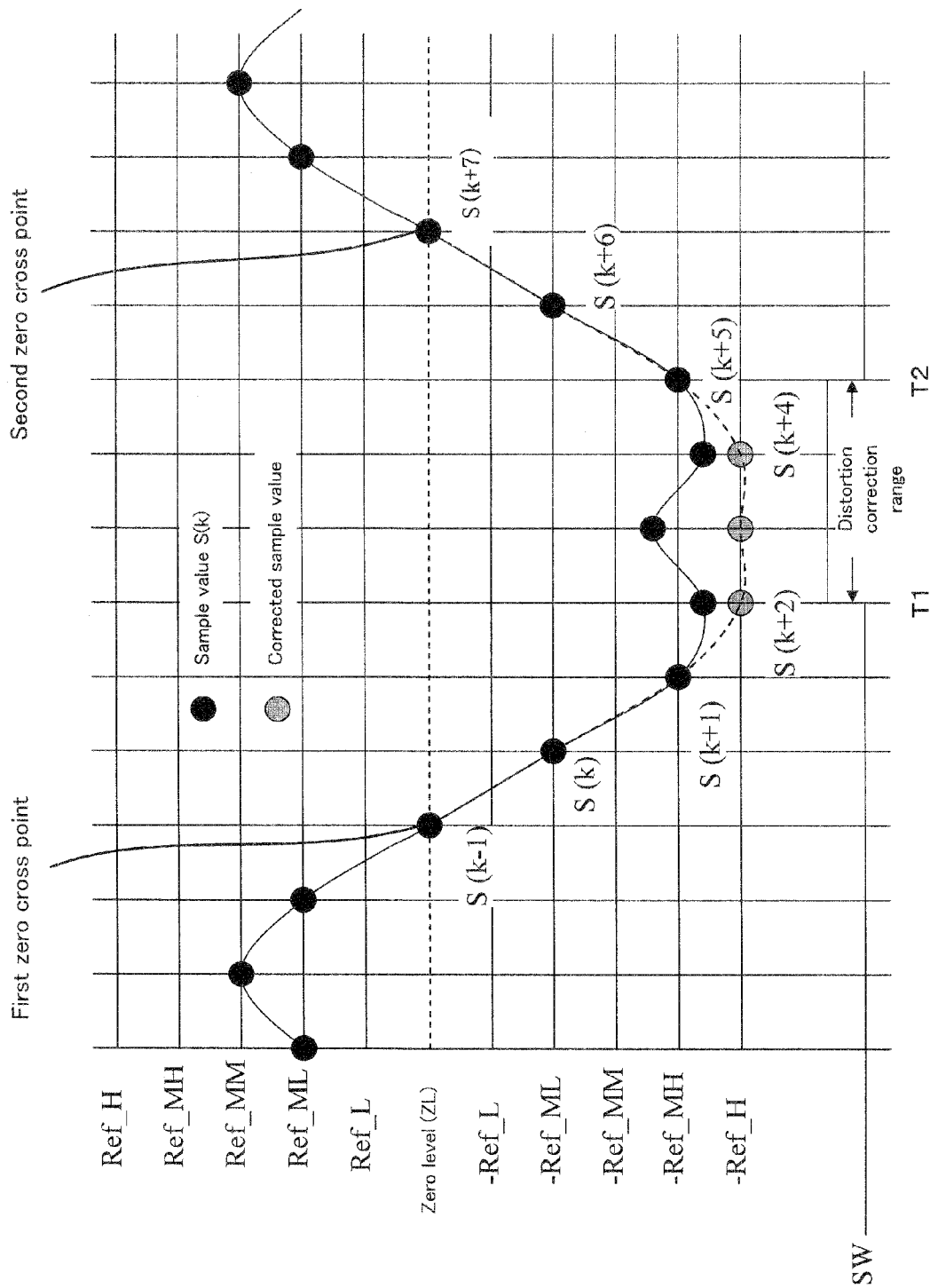

[FIG. 9]
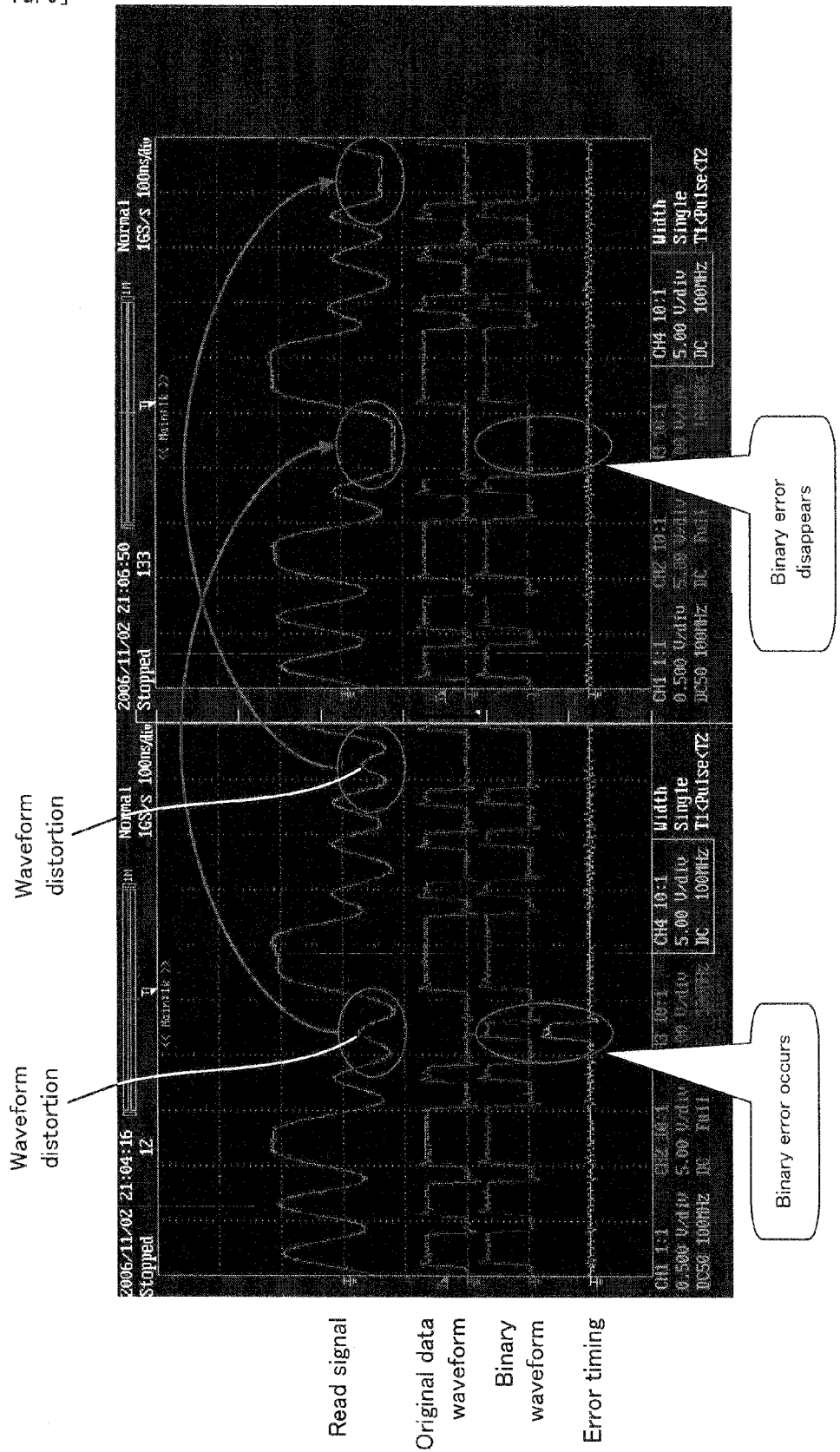

[FIG. 10]
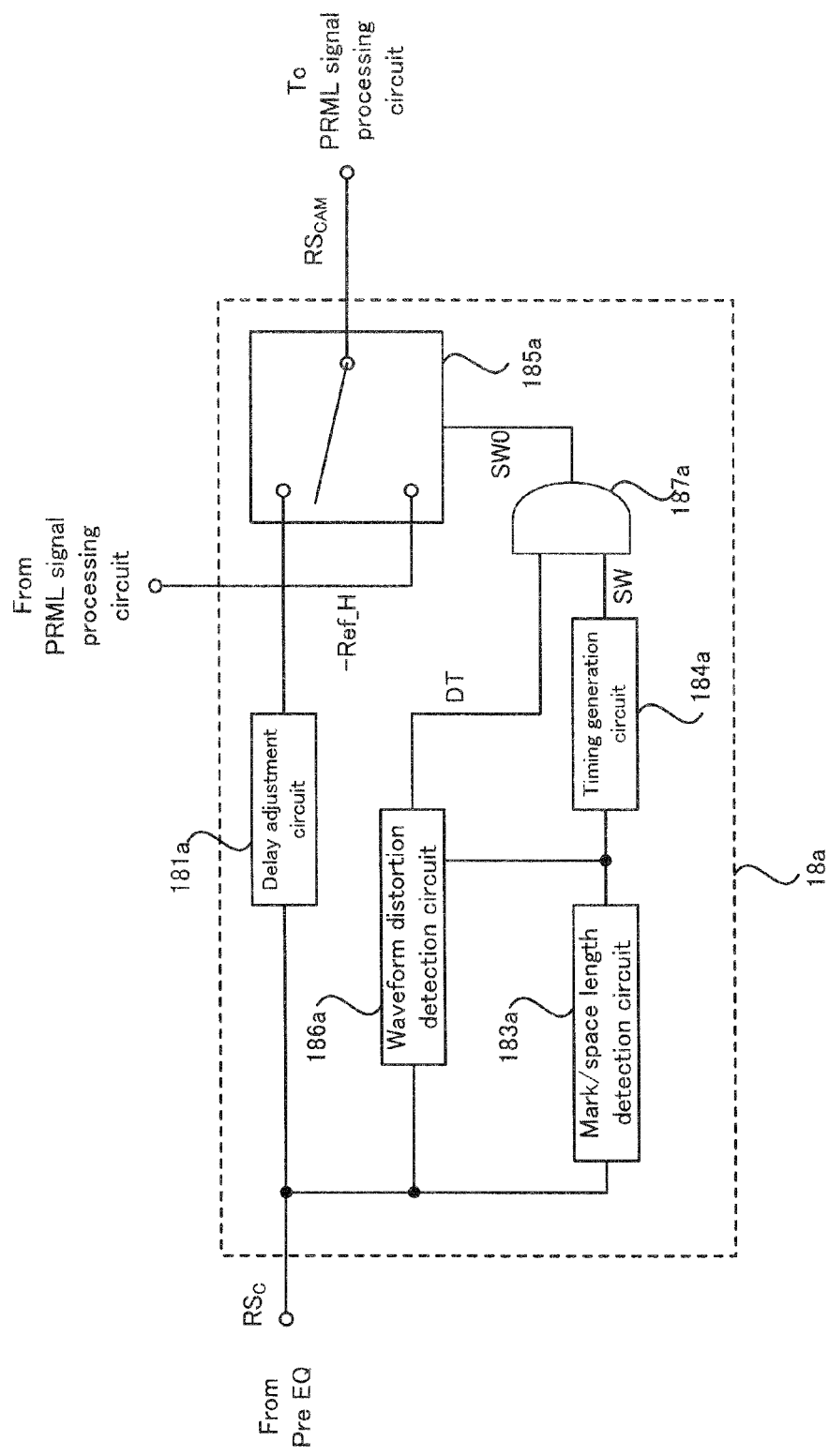

[FIG. 11]
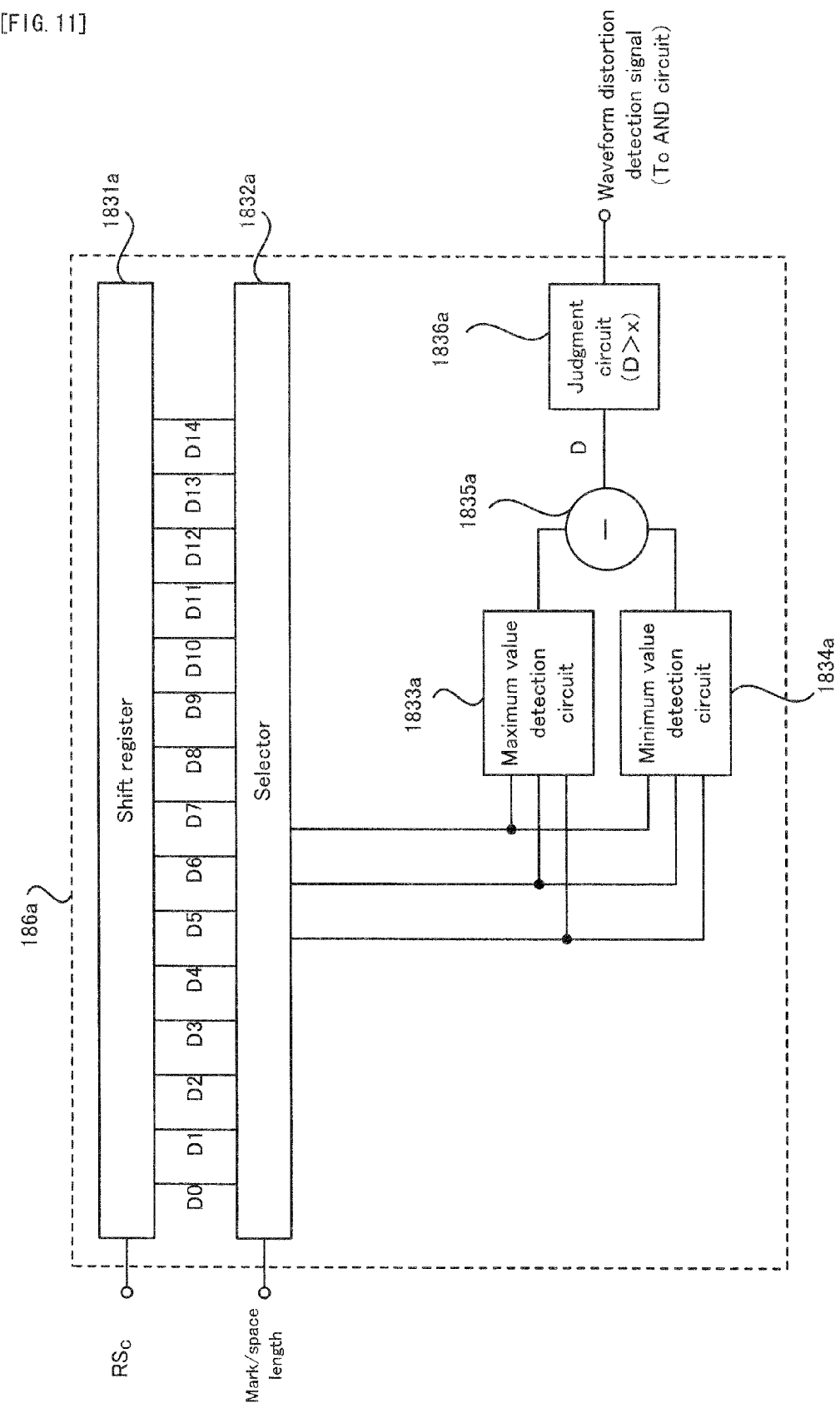

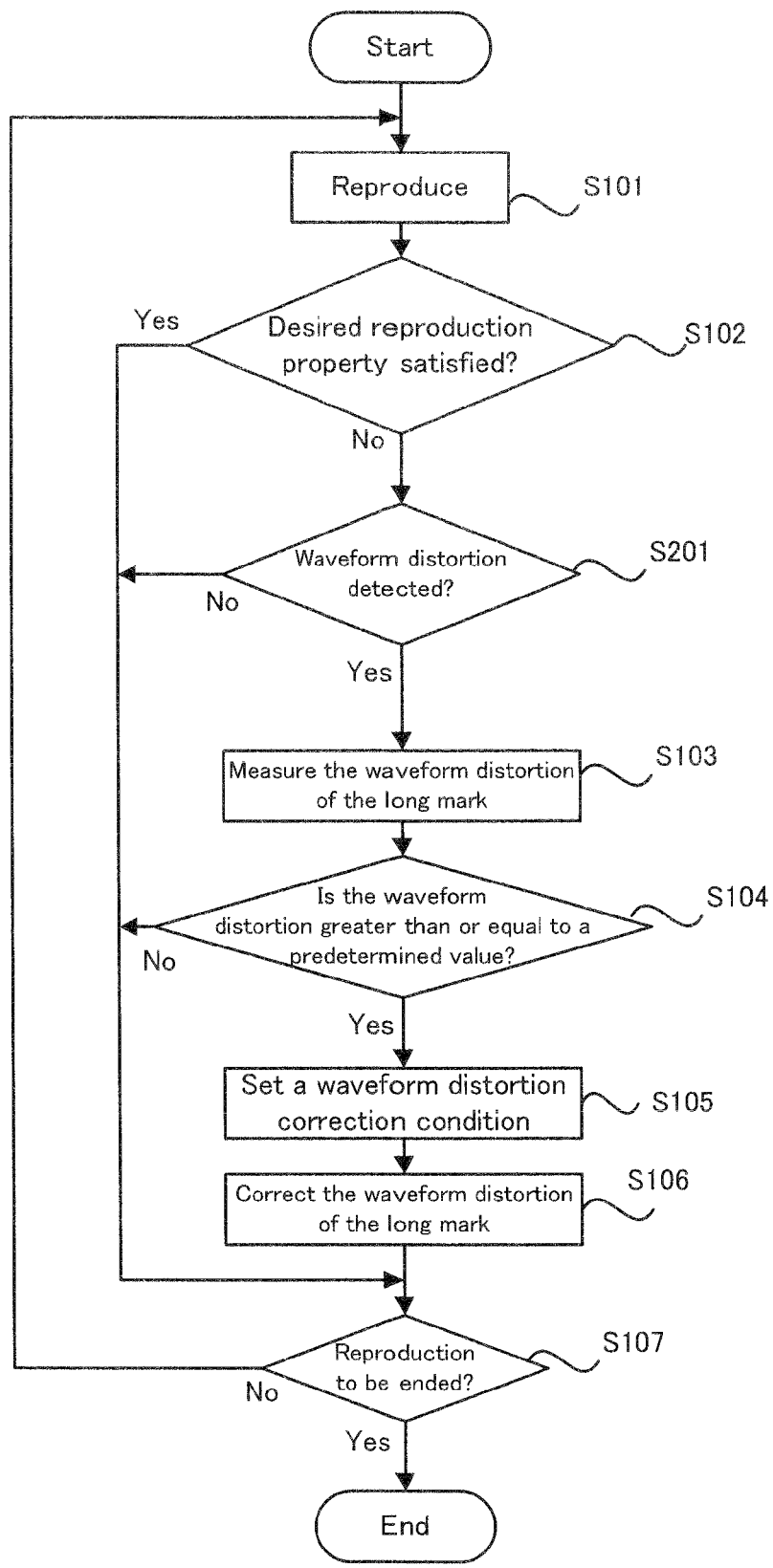
[FIG. 12]

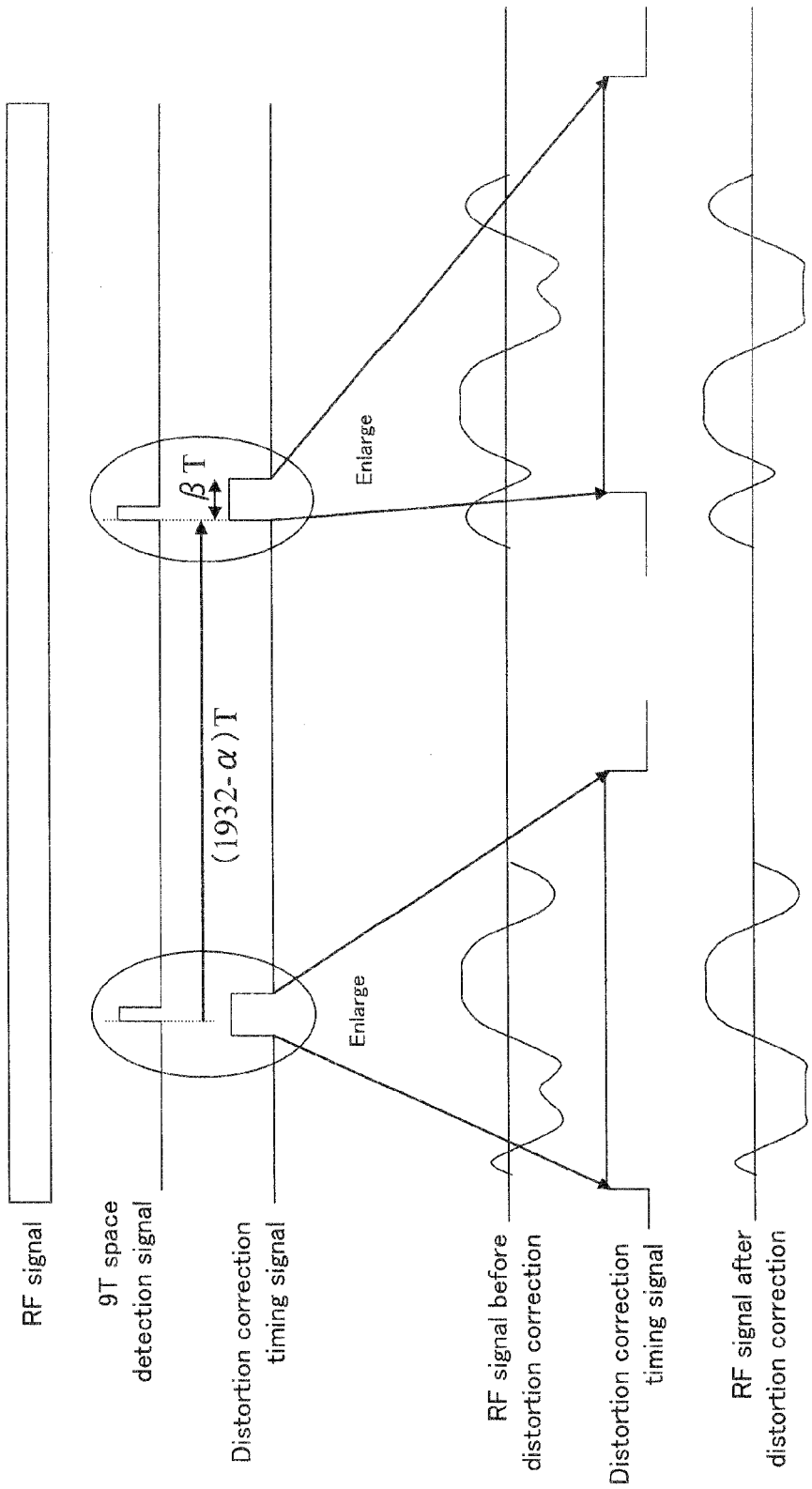
[FIG. 13]

[FIG. 14]
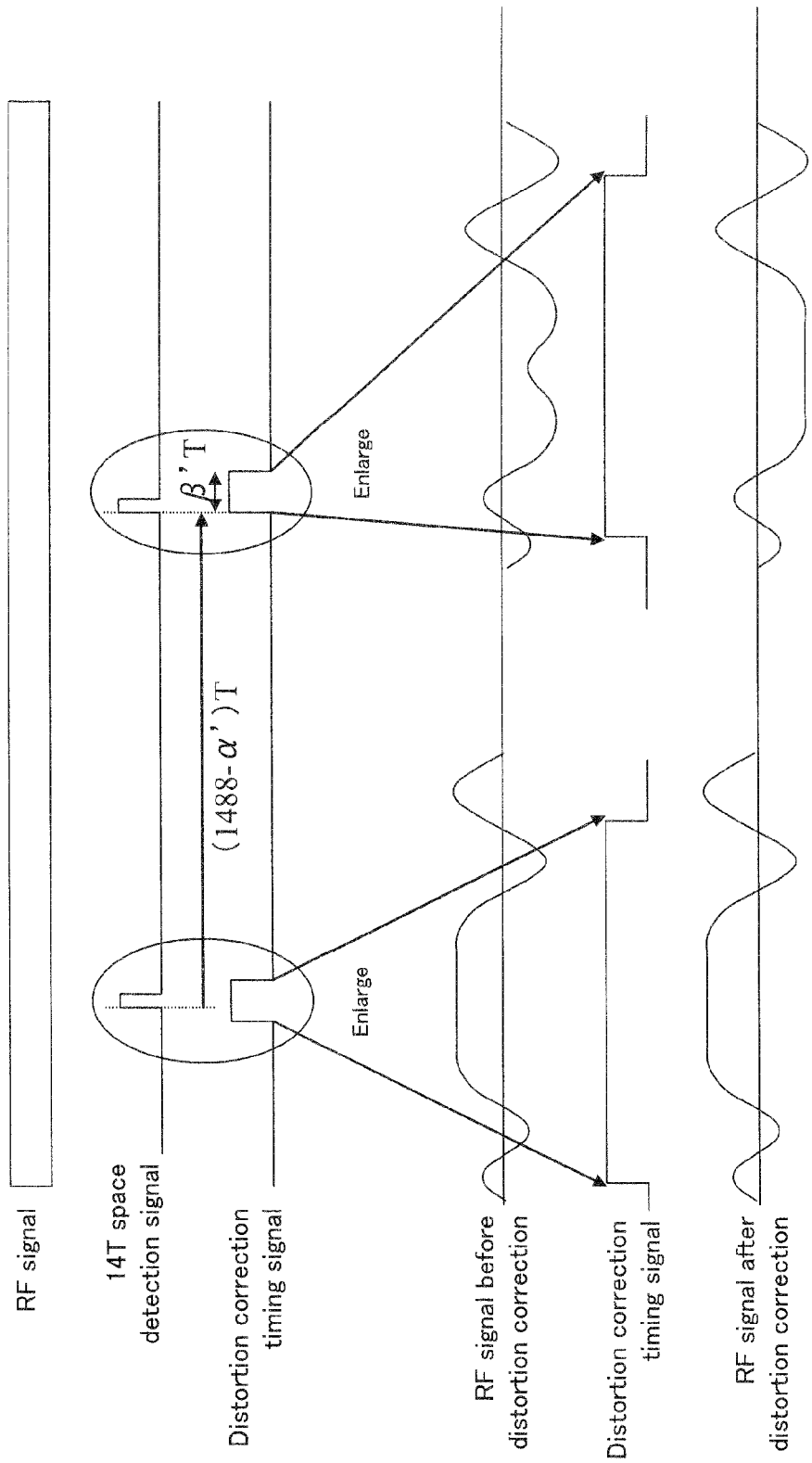

[FIG. 15]
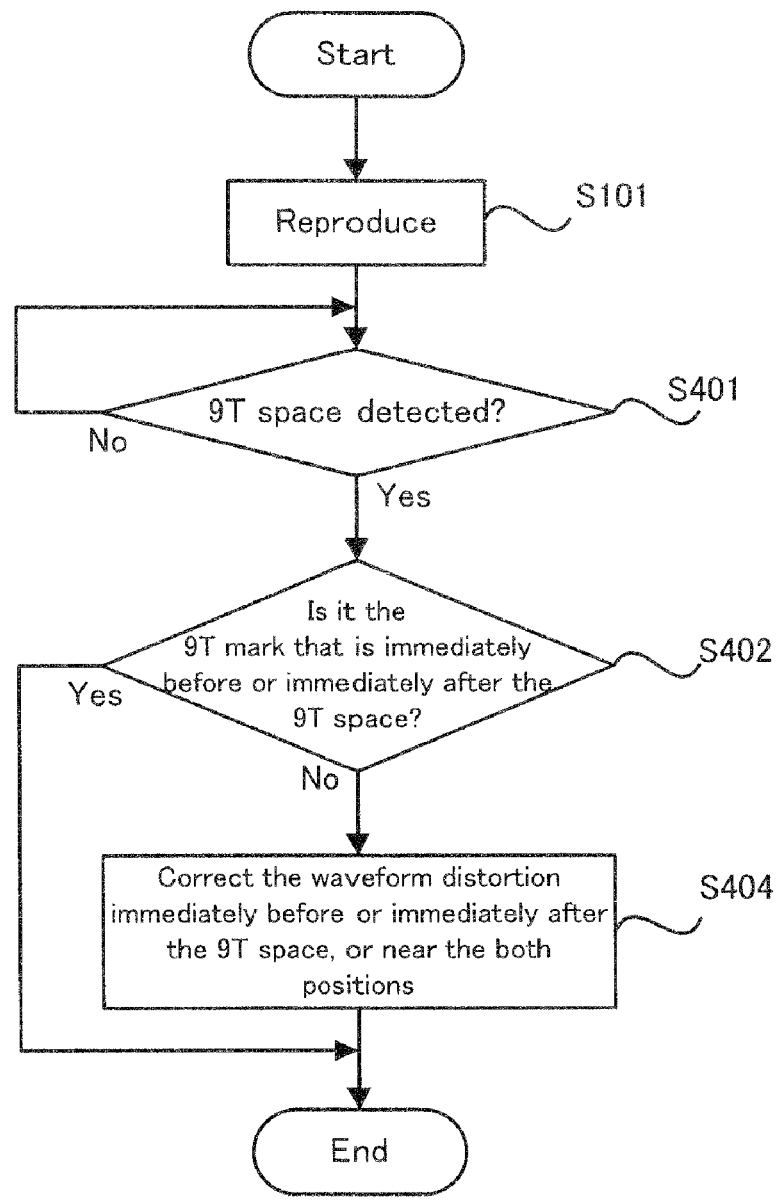

[FIG. 16]
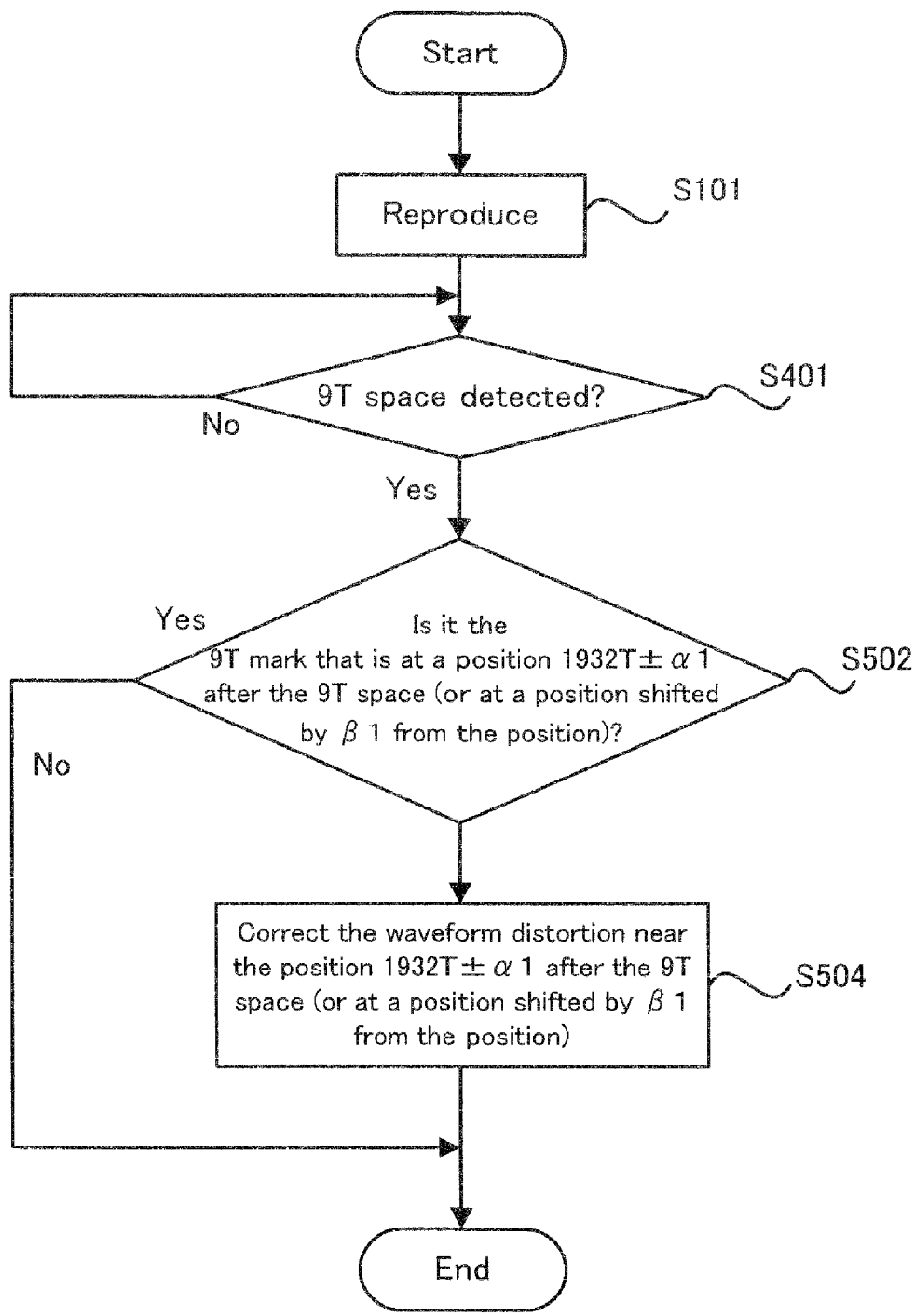

[FIG. 17]
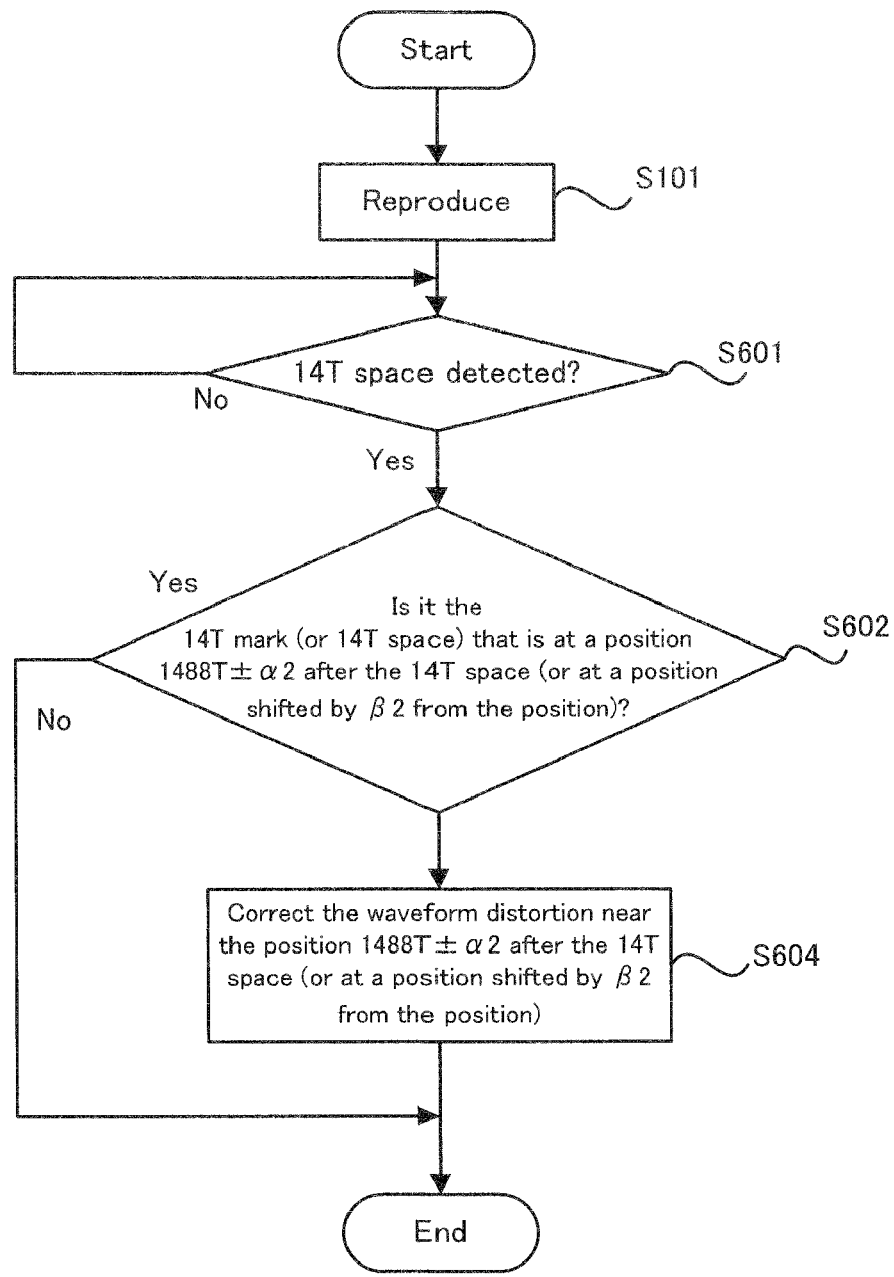

[FIG. 18]
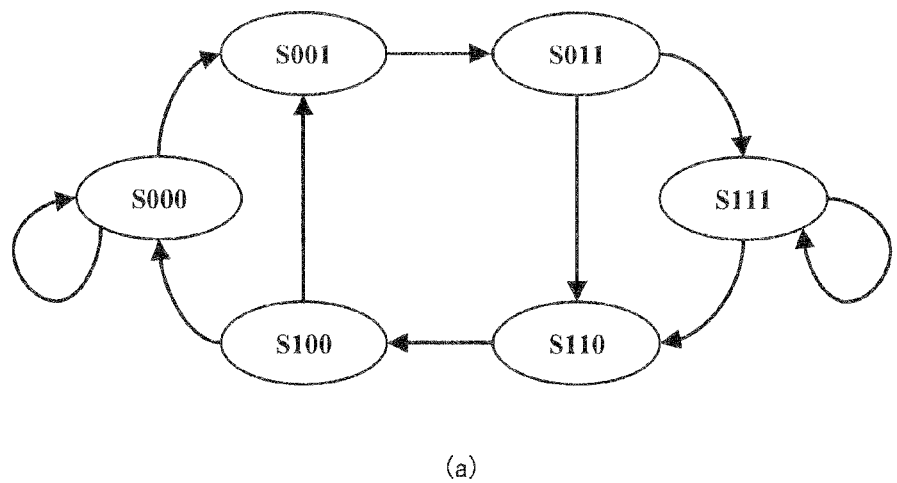
(a)
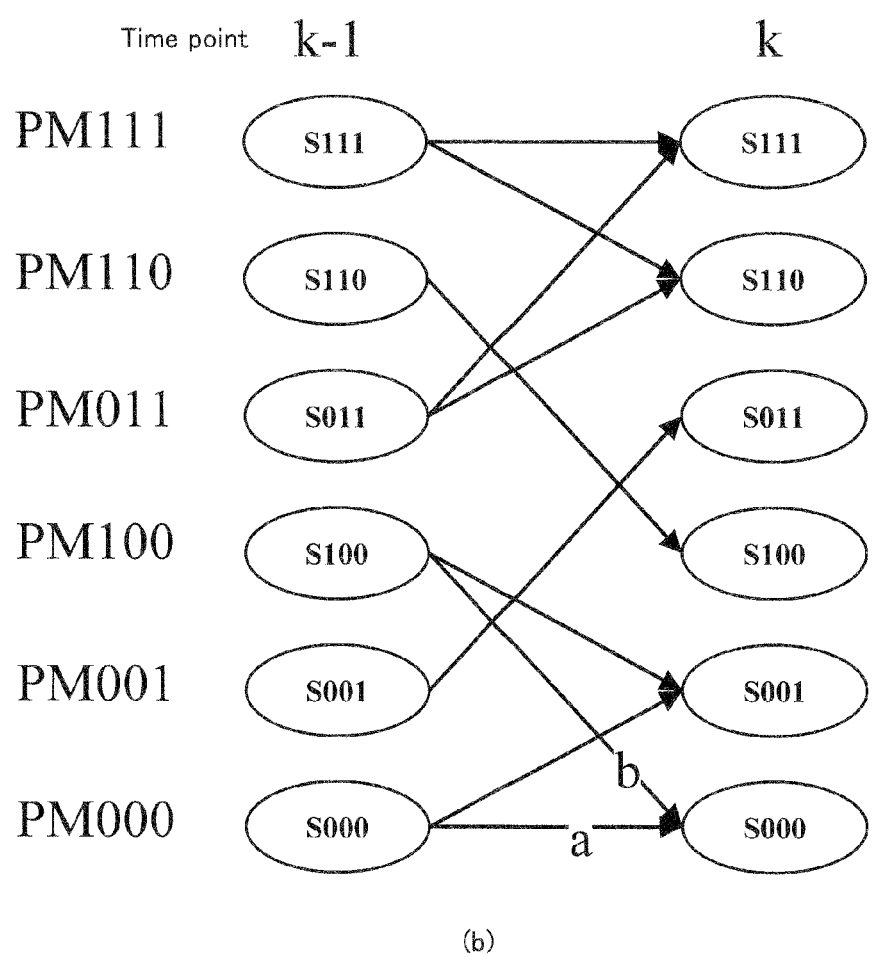
(b)

[FIG. 19]
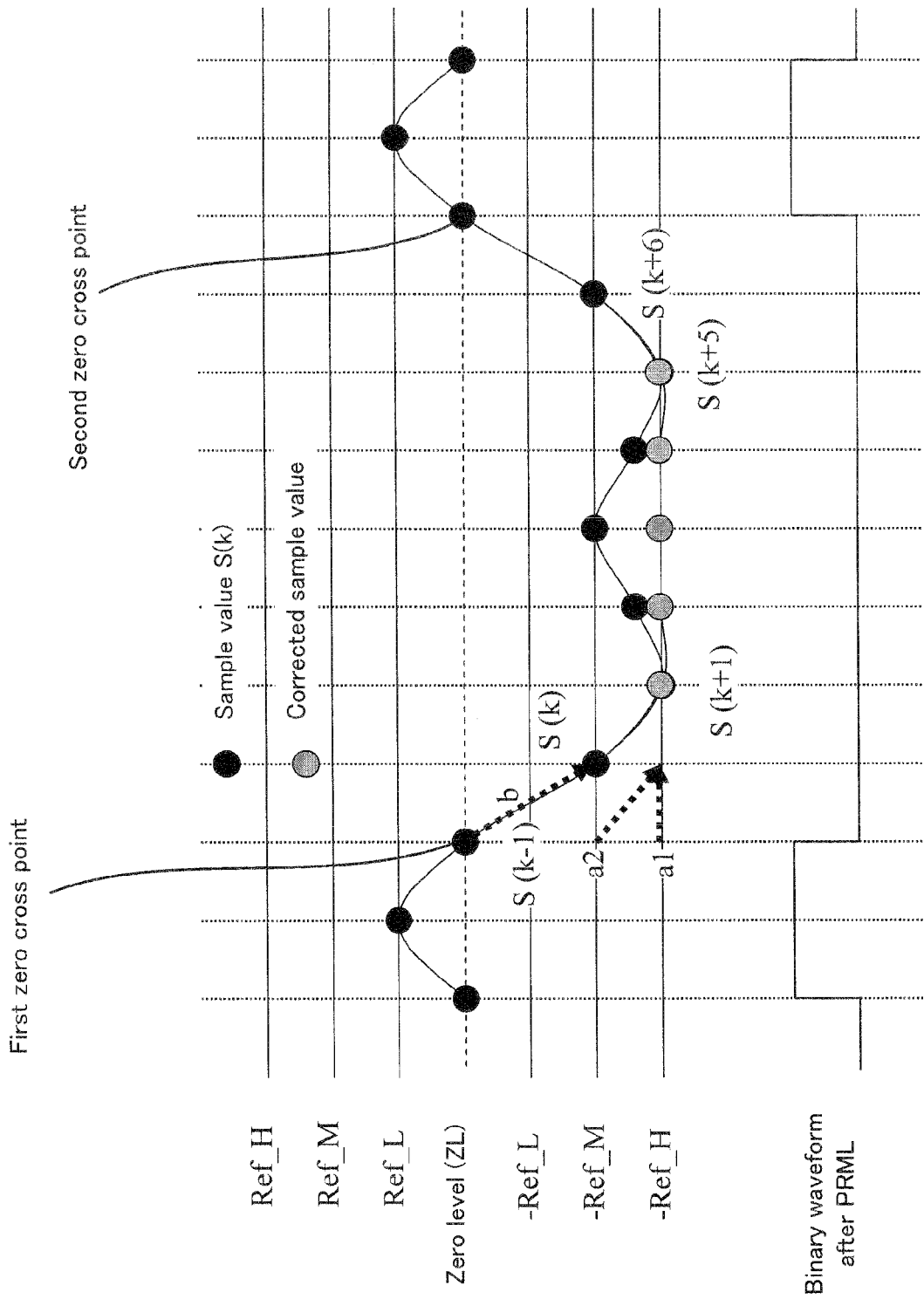

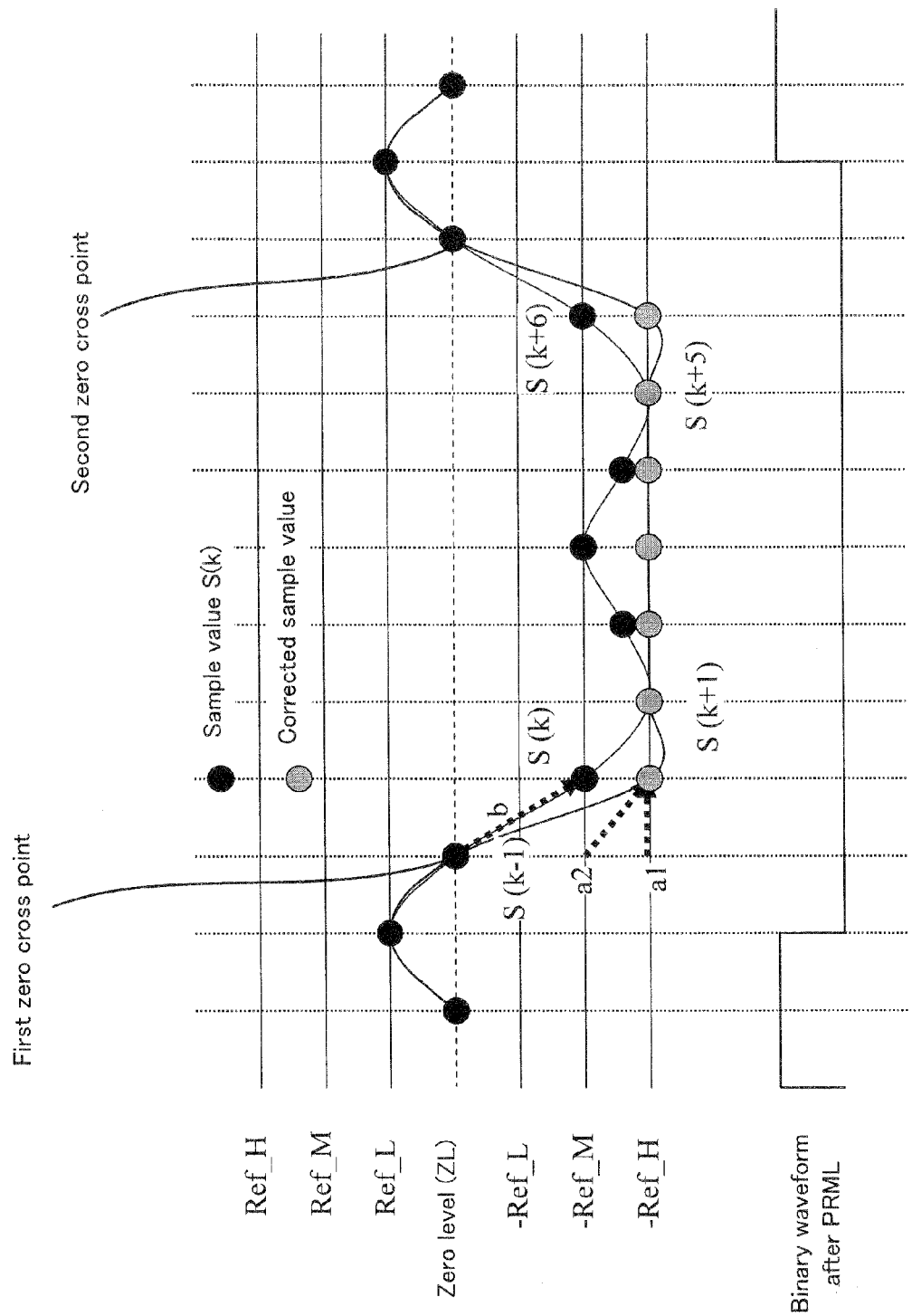
[FIG. 20]

[FIG. 21]
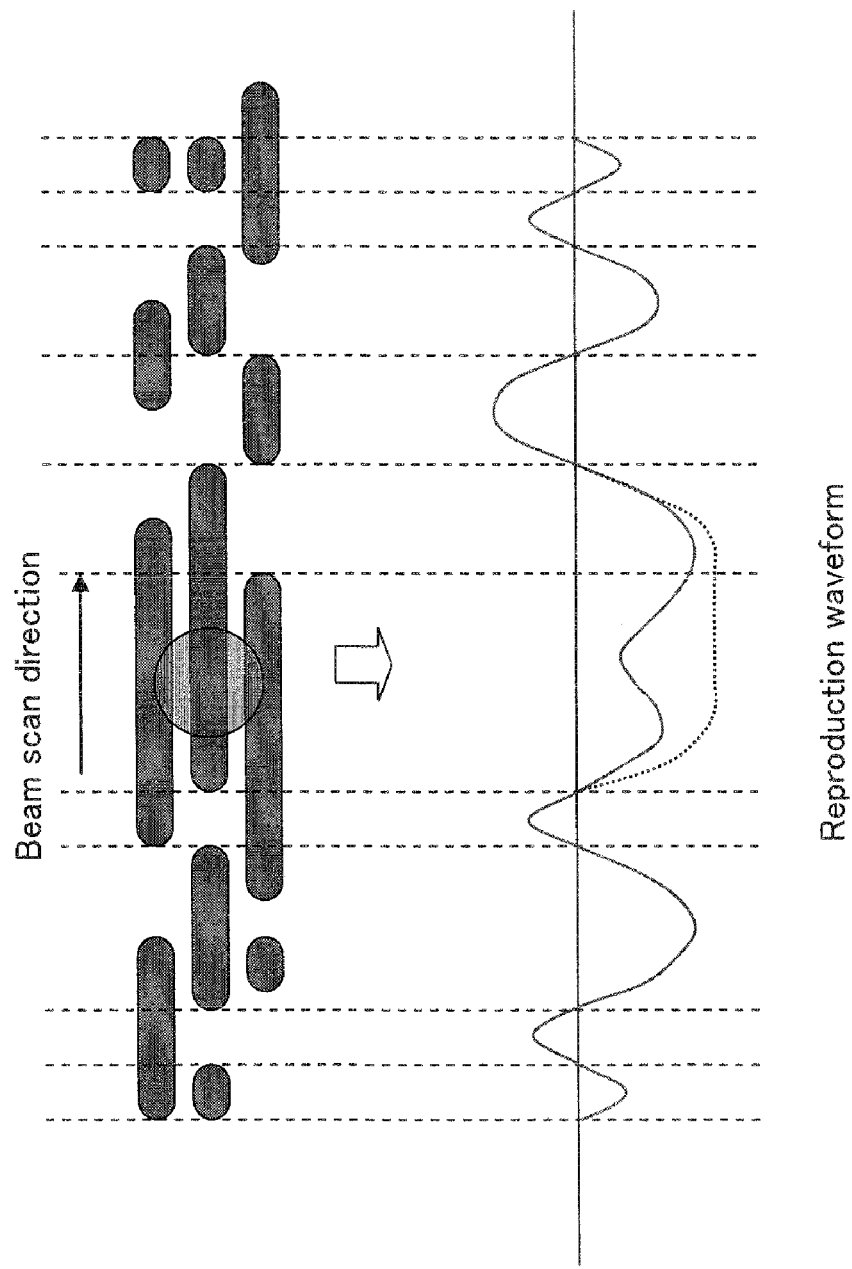

DEVICE AND METHOD FOR REPRODUCING INFORMATION, AND COMPUTER PROGRAM

TECHNICAL FIELD

The present invention relates to an information reproducing apparatus and method which reproduce record data recorded on a recording medium, and particularly relates to an information reproducing apparatus and method which perform waveform equalization, such as a PRML process, on a read signal obtained by reading the record data recorded on the recording medium, as well as a computer program which makes a computer function as the information reproducing apparatus.

BACKGROUND ART

In order to improve the reproduction quality of a read signal read from the recording medium on which the data is recorded at high density, a patent document 1 discloses such a technology that a reproduction system which does not require a high-frequency component is realized by applying a partial response method and by intentionally providing waveform interference in a reproduction system in which an S/N ratio is increased and the amplitude of a high-frequency component is deteriorated with increasing the recording density in a linear recording direction, and that a maximum likelihood decoding method is applied by which a most probable series is estimated from a probability calculation considering the waveform interference (a technology about a so-called PRML process).

Patent document 1: Japanese Patent Application Laid. Open No. 2005-93033

DISCLOSURE OF INVENTION

Subject to be Solved by the Invention

Here, waveform distortion can occur in the read signal. The waveform distortion indicates such a status that there is a discrepancy between a proper signal level to be taken and a signal level that actually appears in the read signal. The waveform distortion likely deteriorates the reproduction quality. This likely leads to a disadvantage that a mark with a relatively long run length is misjudged to be another mark. Specifically, for example, this likely leads to a disadvantage that a mark with a run length of 8T is misjudged to be a mark with a run length of 4T, a space with a run length of 2T, and a mark with a run length of 2T.

In view of the aforementioned conventional problems, it is therefore an object of the present invention to provide an information reproducing apparatus and method which can preferably reproduce the record data even if the waveform distortion occurs, as well as a computer program.

Means for Solving the Subject

The above object of the present invention can be achieved by an information reproducing apparatus provided with: a correcting device for correcting waveform distortion occurring in a read signal corresponding to at least a long mark, of a read signal read from a recording medium; and a processing device for performing a PRML (Partial Response Maximum Likelihood) process on the read signal in which the waveform distortion is corrected.

The above object of the present, invention can be also achieved by an information reproducing method provided with: a correcting process of correcting waveform distortion occurring in a read signal corresponding to at least a long mark, of a read signal read from a recording medium; and a processing process of performing a PRML (Partial. Response Maximum Likelihood) process on the read signal in which the waveform distortion is corrected.

The above object of the present invention can be also achieved by a computer program for reproduction control and for controlling a computer provided in an information reproducing apparatus provided with: a correcting device for correcting waveform distortion occurring in a read signal corresponding to at least a long mark, of a read signal read from a recording medium; and a processing device for performing a PRML (Partial Response Maximum. Likelihood) process on the read signal in which the waveform distortion is corrected, the computer program making the computer function as at least one portion of the correcting device and the processing device.

The operation and other advantages of the present invention will become more apparent from the embodiments described below.

BRIEF DESCRIPTION OF DRAWINGS

FIG. 1 is a block diagram conceptually showing the basic structure of an information reproducing apparatus in an example.

FIG. 2 are waveform charts conceptually showing a first example of waveform distortion.

FIG. 3 are waveform charts conceptually showing a second example of waveform distortion.

FIG. 4 is a flowchart conceptually showing a flow of an operation of correcting the waveform distortion.

FIG. 5 is a waveform chart conceptually showing the operation of correcting the waveform distortion on the sample value series $RS_C$ if a PRML signal processing circuit adopts a PR(1, 2, 1) method.

FIG. 6 is a waveform chart conceptually showing the operation of correcting the waveform distortion on the sample value series $RS_C$ if the PRML signal processing circuit adopts a PR(1, 2, 2, 1) method.

FIG. 7 is a waveform chart conceptually showing the operation of correcting the waveform distortion on the sample value series $RS_C$ if the PRML signal processing circuit adopts a PR(1, 2, 2, 2, 1) method.

FIG. 8 is a waveform chart conceptually showing the operation of correcting the waveform distortion on the sample value series $RS_C$ if the PRML signal processing circuit adopts a PR(1, 2, 2, 2, 2, 1) method.

FIG. 9 is a waveform chart conceptually showing a waveform or the like of a read signal before and after the correction of the waveform distortion.

FIG. 10 is a block diagram conceptually showing the structure of a waveform distortion correction circuit provided for an information reproducing apparatus in a first modified example.

FIG. 11 is a block diagram conceptually showing the structure of a waveform distortion detection circuit provided for the waveform distortion correction circuit provided for the information reproducing apparatus in the first modified example.

FIG. 12 is a flowchart conceptually showing a flow of operations by the information reproducing apparatus in the first modified example.

FIG. 13 is a timing chart conceptually showing an operation of correcting the waveform distortion by an information reproducing apparatus in a second modified example, on a first read signal.

FIG. 14 is a timing chart conceptually showing the operation of correcting the waveform distortion by the information reproducing apparatus in the second modified example, on a second read signal.

FIG. 15 is a flowchart conceptually showing a first flow of operations by the information reproducing apparatus in the second modified example.

FIG. 16 is a flowchart conceptually showing a second flow of operations by the information reproducing apparatus in the second modified example.

FIG. 17 is a flowchart conceptually showing a third flow of operations by the information reproducing apparatus in the second modified example.

FIG. 18 are a state transition diagram in the PR (1, 2, 2, 1) method and a trellis diagram obtained by developing the state transition diagram in a time axis direction.

FIG. 19 is a waveform diagram conceptually showing the operation of correcting the waveform distortion, on the sample value series, the operation being aimed at sample values included in a range between a sample value located two after a first zero cross point and a sample value located two before a second zero cross point, if the PR (1, 2, 2, 1) method is applied.

FIG. 20 is a waveform diagram conceptually showing the operation of correcting the waveform distortion, on the sample value series, the operation being aimed at sample values included in a range between a sample value located one after the first zero cross point and a sample value located one before the second zero cross point, if the PR (1, 2, 2, 1) method is applied.

FIG. 21 is a plan view schematically showing marks on a recording surface of a read-only type optical disc.

DESCRIPTION OF REFERENCE CODES 1, 2 information reproducing apparatus
10 spindle motor
11 pickup
12 HPF
13 A/D converter
14 pre-equalizer
15 PRML signal processing circuit
16 binary circuit
17 decoding circuit
18 waveform distortion correction circuit
181 delay adjustment circuit
182 distortion-correction-value detection circuit
183 mark/space length detection circuit
184 timing generation circuit
185 selector
186 waveform distortion detection circuit

BEST MODE FOR CARRYING OUT THE INVENTION

Hereinafter, as the best mode for carrying out the present invention, an explanation will be given on embodiments of the information reproducing apparatus and method, and the computer program of the present invention.

Embodiment of Information Reproducing Apparatus

An embodiment of the information reproducing apparatus of the present invention is an information reproducing apparatus provided with: a correcting device for correcting waveform distortion occurring in a read signal corresponding to at least a long mark, of a read signal read from a recording medium; and a processing device for performing a PRML (Partial Response Maximum Likelihood) process on the read signal in which the waveform distortion is corrected.

According to the embodiment of the information reproducing apparatus of the present invention, by the operation of the correcting device, the waveform distortion is corrected which occurs in the read signal corresponding to at least the long mark (e.g. marks with run lengths of 7T to 11T and 14T if the recording medium is a DVD, and marks with run lengths of 6T to 9T if the recording medium is a Blu-ray Disc). Here, the waveform distortion (and more specifically, for example, the signal level or the like of the waveform distortion) is preferably corrected such that the waveform distortion does not have an adverse effect on the PRML process described later.

Then, by the operation of the processing device, the PRML process is performed on the read signal in which the waveform distortion is corrected (hereinafter referred to as a "distortion-corrected signal", as occasion demands). Incidentally, the PRML process is described in the aforementioned patent document 1 or the like, so that the detailed explanation thereof will be omitted.

As described above, since the waveform distortion occurring in the read signal is corrected before the PRML process is performed, the waveform distortion hardly has or does not have an adverse effect on the PRML process even if the waveform distortion occurs in the read signal read from the recording medium. More specifically, for example, it is possible to preferably prevent such a disadvantage that the long mark is misjudged to be another mark. By this, the PRML process can be preferably performed even on the read signal in which the waveform distortion occurs. As a result, it is possible to preferably reproduce the record data.

In one aspect of the information reproducing apparatus of the present invention, if the waveform distortion occurs in a direction that a signal level increases (in other words, if the signal level of the waveform distortion is greater than a proper signal level to be taken), the correcting device corrects the waveform distortion by correcting a signal component of the read signal which is less than or equal to a reference level and which is in a range that does not mislead a path metric selection in the PRML process.

According to this aspect, by correcting such a signal component, it is possible to preferably correct the waveform distortion without having an adverse effect on the PRML process.

Incidentally, the "reference cross point" in the embodiment indicates a point at which the signal level of the read signal crosses the reference level. If the reference level is a zero level, the reference cross point corresponds to a zero cross point.

In another aspect of the information reproducing apparatus of the present invention, if the waveform distortion occurs in a direction that a signal level reduces (in other words, if the signal level of the waveform distortion is less than a proper signal level to be taken), the correcting device corrects the waveform distortion by correcting a signal component of the read signal which is greater than or equal to a reference level and which is in a range that does not mislead a path metric selection in the PRML process.

According to this aspect, by correcting such a signal component, it is possible to preferably correct the waveform distortion without having an adverse effect on the PRML process.

In another aspect of the information reproducing apparatus of the present invention, if the processing device adopts a PR (C1, C21, C22, . . . , C2k, C1) method, the correcting device corrects the waveform distortion by correcting a signal component between a sample value which appears (k+1)/2 after a first reference cross point and a sample value which appears (k+1)/2 before a second reference cross point located next to the first reference cross point.

According to this aspect, by correcting such a signal component, possible to preferably correct the waveform distortion without having an adverse effect on the PRML process.

In another aspect of the information reproducing apparatus of the present invention, if the processing device adopts a PR (1, 2, 1) method, the correcting device corrects the waveform distortion by correcting a signal component between a sample value which appears one after a first reference cross point and a sample value which appears one before a second reference cross point located next to the first reference cross point.

According to this aspect, by correcting such a signal component, it is possible to preferably correct the waveform distortion without having an adverse effect on the PRML process which adopts the PR (1, 2, 1) method.

In another aspect of the information reproducing apparatus of the present invention, if the processing device adopts a PR (1, 2, 2, 1) method, the correcting device corrects the waveform distortion by correcting a signal component between a sample value which appears two after a first reference cross point and a sample value which appears two before a second reference cross point located next to the first reference cross point.

According to this aspect, by correcting such a signal component, it is possible to preferably correct the waveform distortion without having an adverse effect on the PRML process which adopts the PR (1, 2, 2, 1) method.

In another aspect information reproducing apparatus of the present invention, if the processing device adopts a PR (1, 2, 2, 2, 1) method, the correcting device corrects the waveform distortion by correcting a signal component between a sample value which appears two after a first reference cross point and a sample value which appears two before a second reference cross point located next to the first reference cross point.

According to this aspect, by correcting such a signal component, it is possible to preferably correct the waveform distortion without having an adverse effect on the PRML process which adopts the PR (1, 2, 2, 2, 1) method.

In another aspect of the information reproducing apparatus of the present invention, if the processing device adopts a PR (1, 2, 2, 2, 2, 1) method, the correcting device corrects the waveform distortion by correcting a signal component between a sample value which appears three after a first reference cross point and a sample value which appears three before a second reference cross point located next to the first reference cross point.

According to this aspect, by correcting such a signal component, it is possible to preferably correct the waveform distortion without having an adverse effect on the PRML, process which adopts the PR (1, 2, 2, 2, 2, 1) method.

In another aspect of the information reproducing apparatus of the present invention, if the waveform distortion occurs in a direction that a signal level increases, the correcting device corrects the signal level of the waveform distortion to a predicated minimum value in the PRML process.

According to this aspect, it is possible to correct the signal level of the waveform distortion to a preferable signal level. Namely, it is possible to preferably correct the waveform distortion.

In another aspect of the information reproducing apparatus of the present invention, if the waveform distortion occurs in a direction that a signal level reduces, the correcting device corrects the signal level of the waveform distortion to a predicated maximum value in the PRML process.

According to this aspect, it is possible to correct the signal level of the waveform distortion to a preferable signal level. Namely, it is possible to preferably correct the waveform distortion.

In another aspect of the information reproducing apparatus of the present invention, it is further provided with a detecting device for detecting the waveform distortion, the correcting device correcting the waveform distortion if the waveform distortion is detected by the detecting device.

According to this aspect, the waveform is corrected selectively when the waveform distortion is detected. Therefore, it is possible to receive the aforementioned various effects while reducing a load of the information reproducing apparatus.

In another aspect of the embodiment of the information reproducing apparatus of the present invention, the correcting device corrects the waveform distortion (i) if an error correction of the read signal cannot be performed, (ii) if an error rate of the read signal (and more specifically, a reading error rate of the record data obtained from the read signal) is greater than or equal to a predetermined threshold value, or (iii) if a read signal corresponding to synchronization data cannot be read, the synchronization data being used to read user data included in record data, the synchronization data being included in the record data.

According to this aspect, it is possible to receive the aforementioned various effects while reducing the load of the information reproducing apparatus by selectively correcting the waveform distortion in the aforementioned cases.

In particular, as opposed to the recording medium which allows only sequential recording, various recording statuses are mixed in the recording medium which allows random recording. In this case, it is necessary to read the read signal in which the waveform distortion is discontinuously or discretely distributed or not distributed, or to read the read signal which has various signal levels. Therefore, by reproducing the record data without correcting the waveform distortion in a normal case and by reproducing the record data while selectively correcting the waveform distortion in the aforementioned cases, it is possible to receive the aforementioned various effects while reducing the load of the information reproducing apparatus.

In another aspect of the embodiment of the information reproducing apparatus of the present invention, the correcting device corrects the waveform distortion occurring in the read signal corresponding to synchronization data, the synchronization data being used to read user data included in record data, the synchronization data being included in the record data.

According to this aspect, since at least the read signal corresponding to the synchronization data which is important in reproducing the record data can be certainly read, the record data can be preferably reproduced.

In an aspect of the information reproducing apparatus in which the waveform distortion occurring in the read signal corresponding to the synchronization data is corrected, as described above, the correcting device may correct the waveform distortion at least one of before a space which makes a pair with a mark which constitutes the synchronization data of the read signal, after the space, and at a position which satisfies periodicity of the synchronization data, with a base point at the space. Specifically, for example, if the recording medium is a Blu-ray Disc, the correcting device may detect a space with a run length of 9T which makes a pair with a mark with a run length of 9T which constitutes the synchronization data and may correct the waveform distortion at least one of before and after the space with a run length of 9T. Alternatively focusing on the periodicity of the synchronization data, the correcting device may correct the waveform distortion near a position after a lapse of a time corresponding to 1932T from the space with a run length of 9T. Alternatively, for example, if the recording medium is a DVD, focusing on the periodicity of the synchronization data, the correcting device may correct the waveform distortion near a position after a lapse of a time corresponding to 1488T from a space with a run length of 14T.

By virtue of such construction, focusing on the periodicity that the synchronization data appears, it is possible to correct the waveform distortion in the read signal corresponding to the synchronization data, relatively easily.

In another aspect of the embodiment of the information reproducing apparatus of the present invention, the long mark is a mark whose signal level is maximum amplitude.

According to this aspect, it is possible to preferably correct the waveform distortion occurring in the read signal corresponding to the long mark.

In another aspect of the embodiment of the information reproducing apparatus of the present invention, the processing device is provided with: an equalizing device for partial-response equalizing the read signal on the basis of intentional waveform interference which can limit an area frequency component included in the read signal; and a Maximum Likelihood decoding device for estimating a most probable series with respect to an output of said equalizing device.

According to this aspect, by the operations of the equalizing device and the Maximum Likelihood decoding device, it is possible to preferably perform the PRML process on the read signal in which the waveform distortion is corrected.

(Embodiment of Information Reproducing Method)

An embodiment of the information reproducing method of the present invention is an information reproducing method provided with: a correcting process of correcting waveform distortion occurring in a read signal corresponding to at least a long mark, of a read signal read from a recording medium; and a processing process of performing a PRML (Partial Response Maximum Likelihood) process on the read signal in which the waveform distortion is corrected.

According to the embodiment of the information reproducing method of the present invention, it is possible to receive the same various effects as those that can be received by the aforementioned embodiment of the information reproducing apparatus of the present invention.

Incidentally, in response to the various aspects in the aforementioned embodiment of the information reproducing apparatus of the present invention, the embodiment of the information reproducing method of the present invention can also adopt various aspects.

(Embodiment of Computer Program)

An embodiment of the computer program of the present invention is a computer program for reproduction control and for controlling a computer provided in an information reproducing apparatus provided with: a correcting device for correcting waveform distortion occurring in a read signal corresponding to at least a long mark, of a read signal read from a recording medium; and a processing device for performing a PRML (Partial Response Maximum Likelihood) process on the read signal in which the waveform distortion is corrected (i.e. the embodiment of the information reproducing apparatus of the present invention (including its various aspects)), the computer program making the computer function as at least one portion of the correcting device and the processing device.

According to the embodiment of the computer program of the present invention, the aforementioned embodiment of the information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned embodiment of the information reproducing apparatus of the present invention, the embodiment of the computer program of the present invention can also employ various aspects.

An embodiment of the computer program product of the present invention is a computer program product in a computer-readable medium for tangibly embodying a program of instructions executable by a computer provided in an information reproducing apparatus provided with: a correcting device for correcting waveform distortion occurring in a read signal corresponding to at least a long mark, of a read signal read from a recording medium; and a processing device for performing a PRML (Partial Response Maximum Likelihood) process on the read signal in which the waveform distortion is corrected (i.e. the embodiment of the information reproducing apparatus of the present invention (including its various aspects)), the computer program making the computer function as at least one portion of the correcting device and the processing device.

According to the embodiment of the computer program product of the present invention, the aforementioned embodiment of the information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the information reproducing apparatus of the present invention.

Incidentally, in response to the various aspects in the aforementioned embodiment of the information reproducing apparatus of the present invention, the embodiment of the computer program product of the present invention can also employ various aspects.

The operation and other advantages of the present invention will become more apparent from the examples explained below.

As explained above, according to the embodiment of the information reproducing apparatus of the present invention, it is provided with the correcting device and the processing device. According to the embodiment of the information reproducing method of the present invention, it is provided with the correcting process and the processing process. According to the embodiment of the computer program of the present invention, it makes a computer function as the embodiment of the information reproducing apparatus of the present invention. Therefore, it is possible to preferably reproduce the data even if the waveform distortion occurs.

EXAMPLES

Hereinafter, an example of the present invention will be described on the basis of the drawings.

(1) Basic Structure

Firstly, with reference to FIG. 1, an example of the information reproducing apparatus of the present invention will be described. FIG. 1 is a block diagram conceptually showing the basic structure of the information reproducing apparatus in the example.

As shown in FIG. 1, an information reproducing apparatus 1 in the example is provided with a spindle motor 10, a pickup (PU) 11, a HPF (High Pass Filter) 12, an A/D converter 13, a pre-equalizer 14, a RPML signal processing circuit 15, a decoding circuit 17, and a waveform distortion correction circuit 18.

The pickup 11 photoelectrically converts reflected light when a laser beam LB is irradiated to a recording surface of an optical disc 100 rotated by the spindle motor 10, thereby generating a read signal $R_{RF}$.

The HPF 12 removes a low-frequency component of the read signal $R_{RF}$ outputted from the pickup, and it outputs a resulting read signal $R_{HC}$ to the A/D converter 13.

The A/D converter 13 samples the read signal in accordance with a sampling clock outputted from a PLL (Phased Lock Loop) not illustrated or the like, and it outputs a resulting read sample value series RS to the pre-equalizer 14.

The pre-equalizer 14 removes intersymbol interference which is based on transmission characteristics in an information reading system, which is formed of the pickup 11 and the optical disc 100, and it outputs a resulting read sample value series $RS_C$ to the waveform distortion correction circuit 18.

The waveform distortion correction circuit 18 constitutes one specific example of the "correcting device" of the present invention. The waveform distortion correction circuit 18 corrects waveform distortion occurring in the read sample value series $RS_C$ (i.e. waveform distortion occurring in the read signal $R_{RF}$). A resulting distortion-corrected read sample value series $RS_{CAM}$ is outputted to the PRML signal processing circuit 15.

The PRML signal processing circuit 15 performs a PRML process on the distortion-corrected read sample value series $RS_{CAM}$, and it outputs a resulting binary signal to the decoding circuit 17.

Incidentally, the PRML signal processing circuit 15 is provided with a PR (Partial Response) equalization circuit 151, represented by a FIR (Finite Impulse Response) filter, a transversal filter, or the like; and a maximum likelihood decoding circuit 152 represented by Viterbi decoder or the like. The PR equalization circuit 15 performs a partial response equalization process for limiting or controlling a high-frequency noise and providing intentional intersymbol interference, on the distortion-corrected read sample value series $RS_{CAM}$. The maximum likelihood decoding circuit 152 estimates a most probable series, on the basis of an added coding rule, with respect to the distortion-corrected read sample value series $RS_{CAM}$ on which the partial response equalization process is performed, thus generating the binary signal. Such a PRML process can use a conventional PRML process, so that the detailed explanation thereof will be omitted.

The decoding circuit 17 performs a decoding process or the like on the binary signal, and it outputs a resulting reproduction signal to external reproduction equipment, such as a display and a speaker. As a result, data recorded on the optical disc 100 (e.g. video data, audio data, and the like) is reproduced.

In the information reproducing apparatus 1 in the example, in particular, the PRML process is performed on the PRML signal processing circuit 15 after the correction of the waveform distortion. Hereinafter, specific examples of the correction of the waveform distortion will be detailed.

(2) Waveform Distortion

Firstly, with reference to FIG. 2 and FIG. 3, the waveform distortion will be described. FIG. 2 are waveform charts conceptually showing a first example of waveform distortion. FIG. 3 are waveform charts conceptually showing a second example of waveform distortion.

As shown in FIG. 2(a), the waveform distortion indicates a difference between a proper signal level to be taken and a signal level that actually appears in the read signal $R_{RF}$. The waveform distortion is quantitatively defined by a waveform distortion amount D for the maximum amplitude A of the read signal $R_{RF}$, and a waveform distortion amount D' which is a signal level from a zero level to the peak of the waveform distortion. In FIG. 2(a), a thick dashed line denotes the proper signal level to be taken when there is no waveform distortion. If there is no waveform distortion, the waveform distortion amount D is obviously zero.

Incidentally, the waveform distortion shown in FIG. 2(a) shows such waveform distortion that the signal level in a middle portion is changed, compared to the signal level in a front edge portion and a rear edge portion of the read signal $R_{RF}$. Apart from such waveform distortion, there can be such waveform distortion that the signal level in the front edge portion and the middle portion is changed, compared to the signal level in the rear edge portion of the read signal $R_{RF}$ as shown in FIG. 2(b); and such waveform distortion that the signal level in the middle edge portion and the rear portion is changed, compared to the signal level in the front edge portion of the read signal $R_{RF}$ as shown in FIG. 2(c). For any waveform distortion, the structure and operation described later can be obviously adopted.

Moreover, in FIG. 2(a) to FIG. 2(c), an explanation was given on the waveform distortion occurring on the optical disc 100 in which the reflectance of the laser beam LB is reduced by forming the marks. In other words, an explanation was given on the example in which the waveform distortion occurs such that the signal level unintentionally increases in the signal level which is the zero level or less. However, as shown in FIG. 3(a), there can be also the waveform distortion occurring on the optical disc 100 (or so-called low-to-high disc) in which the reflectance of the laser beam LB is increased by recording the data, as in an optical disc such as a Blu-ray disc in which a pigmented film is used as a recording layer. In other words, such waveform distortion can occur that the signal level unintentionally reduces in the signal level which is the zero level or more. Incidentally, in the case where such waveform distortion can occur that the signal level unintentionally reduces in the signal level which is the zero level or more, there can be such waveform distortion that the signal level in the front edge portion and the middle portion is changed, compared to the signal level in the rear edge portion of the read signal $R_{RF}$, as shown in FIG. 3(b), as in the case where such waveform distortion occurs that the signal level unintentionally reduces as shown in FIG. 2(b), in the signal level which is the zero level or more. Moreover, there can be also such waveform distortion that the signal level in the middle portion and the rear edge portion is changed, compared to the signal level in the front edge portion of the read signal $R_{RF}$, as shown in FIG. 3(c), as in the case where such waveform distortion occurs that the signal level unintentionally reduces shown in FIG. 2(c).

Moreover, in the example, it is preferable to focus on the waveform distortion which occurs in the read signal corresponding to the record mark with a relatively long run length (hereinafter referred to as a "long mark": e.g. data with run lengths of 7T to 11T or 14T if the optical disc 100 is a DVD, and data with run lengths of 6T to 9T if the optical disc 100 is a Blu-ray Disc). Alternatively, with emphasis on the importance of synchronization data (i.e. sync data), it is preferable to focus on the waveform distortion which occurs in the read signal corresponding to the mark corresponding to the synchronization data (e.g. data with a run length of 14T if the optical disc 100 is a DVD, and data with a run length of 9T if the optical disc 100 is a Blu-ray Disc).

(3) Operation Example of Correcting Waveform Distortion

Next, with reference to FIG. 4, an explanation will be given on a specific operation example of correcting the waveform distortion. FIG. 4 is a flowchart conceptually showing a flow of the operation of correcting the waveform distortion.

As shown in FIG. 4, firstly, an operation of reproducing data recorded on the optical disc 100 is performed (step S101).

In the reproduction operation, it is sequentially judged whether or not a symbol error rate (SER) is greater than or equal to a predetermined threshold value, or whether or not error correction using an ECC (Error Correction Code) or the like is unable to be performed, or whether or not the synchronization data is unable to be read (step S102). Here, the predetermined threshold value is preferably set on the basis of whether or not the preferable reproduction is performed. Specifically, it is preferable to set the value of the symbol error rate which does not allow the preferable reproduction operation (e.g. approximately 0.001 or more), as the predetermined threshold value.

As a result of the judgment in the step S102, if it is judged that the symbol error rate is not greater than or equal to the threshold value, and that the error correction is not unable to be performed, and that the synchronization data is not unable to be read (the step S102: No), the operational flow goes to a step S107.

On the other hand, as a result of the judgment in the step S102, if it is judged that the symbol error rate is greater than or equal to the threshold value, or that the error correction is unable to be performed, or that the synchronization data is unable to be read (the step S102: Yes), then, the waveform distortion of the long mark is measured (step S103). Here, a waveform distortion ratio (i.e. D/A×100) which indicates a ratio of the waveform distortion amount D (or D') to the maximum amplitude A of the read signal $R_{RF}$.

Then, it is judged whether or not the waveform distortion is greater than or equal to a predetermined value (step S104). For example, it is judged whether or not the waveform distortion ratio is greater than or equal to approximately 30%.

As a result of the judgment in the step S104, if it is judged that the waveform distortion is not greater than or equal to the predetermined value (e.g. that the waveform distortion ratio is less than or equal to approximately 30%) (the step S104: No), the operational flow goes to the step S107.

On the other hand, as a result of the judgment in the step S104, if it is judged that the waveform distortion is greater than or equal to the predetermined value (e.g. that the waveform distortion ratio is greater than or equal to approximately 30%) (the step S104: Yes), then, a waveform distortion correction condition, such as a correction level and a correction range for the waveform distortion, is set (step S105). The waveform distortion correction condition will be detailed later (refer to FIG. 5 and the like).

Then, the waveform distortion of the long mark is corrected on the basis of the waveform distortion correction condition set in the step S105 (step S106). Incidentally, the operation of correcting the waveform distortion needs to be performed so as not to have an adverse effect on a path metric calculation in the PRML process performed on the PRML signal processing circuit 15, as detailed later.

Then, it is judged whether or not the reproduction operation is to be ended (step S107), and if the reproduction operation is not to be ended (the step S107: No), the operational flow returns to the step S101, and the operations after the step S101 are repeated again.

The operation of correcting the waveform distortion described above will be more clearly explained on waveform charts which show the sample value series $RS_C$ with reference to FIG. 5 to FIG. 8. FIG. 5 is a waveform chart conceptually showing the operation of correcting the waveform distortion on the sample value series $RS_C$ if the PRML signal processing circuit 15 adopts a PR(1, 2, 1) method. FIG. 6 is a waveform chart conceptually showing the operation of correcting the waveform distortion on the sample value series $RS_C$ if the PRML signal processing circuit 15 adopts a PR(1, 2, 2, 1) method, FIG. 7 is a waveform chart conceptually showing the operation of correcting the waveform distortion on the sample value series $RS_C$ if the PRML signal processing circuit 15 adopts a PR(1, 2, 2, 2, 1) method. FIG. 8 is a waveform chart conceptually showing the operation of correcting the waveform distortion on the sample value series $RS_C$ if the PRML signal processing circuit 15 adopts a PR(1, 2, 2, 2, 2, 1) method.

As shown in FIG. 5, if the PRML signal processing circuit 15 adopts a PR(1, 2, 1) method, interpolated sample values, on which the partial response equalization is performed, are divided into five values of Ref_H, Ref_L, 0 (ZL: Zero Level), −Ref_and −Ref_H (however, if the shortest mark/space has a run length restriction of 2T or more, they are divided into the four values except 0). Here, it is correct (i.e. most probable) that the interpolated sample value Sip(k) is −Ref_H. Thus, in order to correct the waveform distortion so as not to influence the path metric calculation in the PRML process, the operation of correcting the waveform distortion is preferably performed in a range between a sample value S(k−0.5), which is a sample value located one after a first zero cross point S(k−1.5), and a sample value S(k+5.5), which is a sample value located one before a second zero cross point S(k+6.5) located next to the first zero cross point S(k−1.5). Moreover, the operation of correcting the waveform distortion is preferably performed such that the signal level after the correction has a predicted minimum value (i.e. −Ref_H) in the PRML process. In conclusion, if the PRML signal processing circuit 15 adopts the PR(1, 2, 1) method, the operation of correcting the waveform distortion is preferably performed such that the signal levels of sample values (i.e. S(k−0.5), S(k+0.5), S(k+1.5), S(k+2.5), S(k+3.5), S(k+4.5), and S(k+5.5)) included in the range between the sample value S(k−0.5) located one after the first zero cross point S(k−1.5) and the sample value S(k+5.5) located one before the second zero cross point S(k+6.5) have the predicted minimum value (i.e. −Ref_H) in the PRML process.

As shown in FIG. 6, if the PRML signal processing circuit 15 adopts a PR(1, 2, 2, 1) method, interpolated sample values, on which the partial response equalization is performed, are divided into seven values of Ref_H, Ref_M, Ref_L, 0 (ZL: Zero Level), −Ref_L, −Ref_M, and −Ref_H. Here, as in the case where the PRML signal processing circuit 15 adopts the PR(1, 2, 1) method, if the signal level of the sample value S(k) located one after the first zero cross point S(k−1) is corrected to the predicted minimum value (−Ref_H), that has an adverse affect on the path metric calculation in the PRML process. In the same manner, if the signal level of the sample value S(k+6) located one before the second zero cross point S(k+7) is corrected to the predicted minimum value (−Ref_H), that has an adverse affect on the path metric calculation in the PRML process. Therefore, if the PRML signal processing circuit 15 adopts the PR(1, 2, 2, 1) method, the operation of correcting the waveform distortion is preferably performed such that the signal levels of sample values (i.e. S(k+1), S(k+2), S(k+3), S(k+4), and S(k+5)) included in the range between the sample value S(k+1) located two after the first zero cross point S(k−1) and the sample value S(k+5) located two before the second zero cross point S(k+7) have the predicted minimum value (i.e. −Ref_H) in the PRML process.

As shown in FIG. 7, if the PRML signal processing circuit 15 adopts a PR(1, 2, 2, 2, 1) method, interpolated sample values, on which the partial response equalization is performed, are divided into nine values of Ref_H, Ref_MH, Ref_ML, Ref_L, 0 (ZL: Zero Level), −Ref_L, −Ref_ML, −Ref_MH, and −Ref_H. Here, as in the case where the PRML signal processing circuit 15 adopts the PR(1, 2, 2, 1) method, even if the signal level of the sample value S(k+1) located two after the first zero cross point S(k−1) is corrected to the predicted minimum value (−Ref_H), that does not have an adverse affect on the path metric calculation in the PRML process. In the same manner, even if the signal level of the sample value S(k+5) located two before the second zero cross point S(k+7) is corrected to the predicted minimum value (−Ref_H), that does not have an adverse affect on the path metric calculation in the PRML process. Therefore, if the PRML signal processing circuit 15 adopts the PR(1, 2, 2, 2, 1) method, the operation of correcting the waveform distortion is preferably performed such that the signal levels of sample values (i.e. S(k+1), S(k+2), S(k+3), S(k+4), and S(k+5)) included in the range between the sample value S(k+1) located two after the first zero cross point S(k−1) and the sample value S(k+5) located two before the second zero cross point S(k+7) have the predicted minimum value (i.e. −Ref_H) in the PRML process.

As shown in FIG. 8, if the PRML signal processing circuit 15 adopts a PR(1, 2, 2, 2, 2, 1) method, interpolated sample values, on which the partial response equalization is performed, are divided into eleven values of Ref_H, Ref_MH, Ref_MM, Ref_ML, Ref_L, 0 (ZL: Zero Level), −Ref_L, −Ref_ML, −Ref_MM, −Ref_MH, and −Ref_H. Here, as in the case where the PRML signal processing circuit 15 adopts the PR(1, 2, 2, 2, 1) method, if the signal level of the sample value S(k+1) located two after the first zero cross point S(k−1) is corrected to the predicted minimum value (−Ref_H), that has an adverse affect on the path metric calculation in the PRML process. In the same manner, if the signal level of the sample value S(k+5) located two before the second zero cross point S(k+7) is corrected to the predicted minimum value (−Ref_H), that has an adverse affect on the path metric calculation in the PRML process. Therefore, if the PRML signal processing circuit 15 adopts the PR(1, 2, 2, 2, 2, 1) method, the operation of correcting the waveform distortion is preferably performed such that the signal levels of sample values (i.e. S(k+2), S(k+3), and S(k+4)) included in the range between the sample value S(k+2) located three after the first zero cross point S(k−1) and the sample value S(k+4) located three before the second zero cross point S(k+7) have the predicted minimum value (i.e. −Ref_H) in the PRML process.

In conclusion, the following relation can be found. If the PRML signal processing circuit 15 adopts the PR(1, 2, ..., 2, 1) method (wherein 2 continues m times), the operation of correcting the waveform distortion is preferably performed such that the signal levels of sample values included in the range between the sample value located (m+1)/2 after the first zero cross point and the sample value located (m+1)/2 before the second zero cross point have the predicted minimum value in the PRML process.

Incidentally, the waveform distortion correction condition set in the step S105 in FIG. 4 corresponds to the signal level after the correction (which corresponds to the predicted minimum value here) and the range (i.e. timing) to perform the operation of correcting the waveform distortion, explained in FIG. 5 to FIG. 8.

An effect obtained by correcting the waveform distortion will be described with reference to FIG. 9. FIG. 9 is a waveform chart conceptually showing a waveform or the like of the read signal $R_{RF}$ before and after the correction of the waveform distortion.

As shown on the left side of FIG. 9, if the waveform distortion occurs in the read signal $R_{RF}$, the waveform distortion is likely misjudged to be the normal mark (e.g. the mark with a relatively short run length). Therefore, the binary waveform after binarizing the read signal $R_{RF}$ includes an error signal caused by the waveform distortion. This results in inconsistency with the original record data and causes a binary error.

On the other hand, as shown on the right side of FIG. 9, if the waveform distortion occurring in the read signal $R_{RF}$ is corrected, the binary waveform after binarizing the read signal $R_{RF}$ no longer includes the error signal caused by the waveform distortion. This results in consistency with the original record data and does not cause the binary error.

As explained above, according to the information reproducing apparatus 1 in the example, by performing the PRML process, it is possible to reproduce the record data, stably and accurately.

In particular, according to the information reproducing apparatus 1 in the example, the PRML process is performed on the PRML signal processing circuit after the correction of the waveform distortion. Thus, for example, it is possible to preferably prevent such a disadvantage that the mark with a relatively long run length is misjudged to be another mark. As a result, the waveform distortion rarely causes the binary error, and this allows the preferable reproduction operation.

Incidentally, in the aforementioned explanation, the zero cross point is used; however, if a reference level is used instead of the zero level, the "zero cross point" is obviously replaced by a "reference cross point".

(4) Modified Examples

Next, with reference to FIG. 10 to FIG. 17, an explanation will be given on modified examples of the information reproducing apparatus 1 in the example.

(4-1) First Modified Example

Firstly, with reference to FIG. 10 and FIG. 12, an information reproducing apparatus 1a in a first modified example will be described. FIG. 10 is a block diagram conceptually showing the structure of a waveform distortion correction circuit 18a provided for an information reproducing apparatus 1a in a first modified example. FIG. 11 is a block diagram conceptually showing the structure of a waveform distortion detection circuit 186a provided for the waveform distortion correction circuit 18a provided for the information reproducing apparatus 1a in the first modified example. FIG. 12 is a flowchart conceptually showing a flow of operations by the information reproducing apparatus 1a in the first modified example.

In the operation example shown in FIG. 4, the waveform distortion is always corrected if the read signal $R_{RF}$ does not satisfy a desired reproduction property. In the first modified example, however, even if the read signal $R_{RF}$ does not satisfy the desired reproduction property, the waveform distortion is corrected selectively when the waveform distortion is actually detected. Hereinafter, the specific structure and operation example of the first modified example will be described.

As shown in FIG. 10, the waveform distortion correction circuit 18a is provided with a delay adjustment circuit 181a, a waveform distortion detection circuit 186a, a mark/space length detection circuit 183a, a timing generation circuit 184a, a selector 185a, and an AND circuit 187a.

The read sample value series $RS_C$ outputted from the pre-equalizer 14 is outputted to each of the delay adjustment circuit 181a, the waveform distortion detection circuit 186a, and the mark/space length detection circuit 183a.

The delay adjustment circuit 181a sets a delay amount corresponding to the longest run length of the record data and outputs the read sample value series $RS_C$ to the selector 185a in desired timing. Specifically, if the optical disc 100 is a Blu-ray Disc, the delay adjustment circuit 181a sets a delay amount corresponding to the longest run length of 9T, and if the optical disc 100 is a DVD, the delay adjustment circuit 181a sets a delay amount corresponding to the longest run length of 14T.

The mark/space length detection circuit 183a detects a mark/space length by detecting an interval between the zero cross points, the number of continuous coded bits, and the like. The detection result is outputted to the timing generation circuit 184a.

The timing generation circuit 184a generates a timing signal SW on the basis of the mark/space length detected on the mark/space length detection circuit 183a and outputs the generated timing signal SW to the AND circuit 187a.

Specifically, the timing generation circuit 184a generates a high-level timing signal SW (SW=1) (i) if the mark/space length detected on the mark/space length detection circuit 183a is the long mark which is a target of the waveform distortion correction and (ii) in a period to input sample values in a range between the sample value located (m+1)/2 after the first zero cross point and the sample value located (m+1)/2 before the second zero cross point, and the timing generation circuit 184a outputs the generated timing signal SW to the AND circuit 187a. On the other hand, the timing generation circuit 184 generates a low-level timing signal SW (SW=0) (i) if the mark/space length detected on the mark/space length detection circuit 183a is a mark other than the long mark which is a target of the waveform distortion correction or (ii) in a period to input sample values out of the range between the sample value located (m+1)/2 after the first zero cross point and the sample value located (m+1)/2 before the second zero cross point, and the timing generation circuit 184a outputs the generated timing signal SW to the AND circuit 187a.

The waveform distortion detection circuit 186a detects the waveform distortion and outputs a waveform distortion detection signal DT which indicates that the waveform distortion is detected, to the AND circuit 187a. More specifically, the waveform distortion detection circuit 186a outputs a high-level waveform distortion detection signal DT (DT=1) to the AND circuit 187a if the waveform distortion is detected, and outputs a low-level waveform distortion detection signal DT (DT=0) to the AND circuit 187a if the waveform distortion is not detected.

The AND circuit 187a generates a high-level timing signal SW0 if the waveform distortion is detected (if each of the timing signal. SW outputted from the timing generation circuit 184a and the waveform distortion detection signal DT outputted from the waveform distortion detection circuit 186a is high-level), on the basis of the output of each of the timing generation circuit 184a and the waveform distortion detection circuit 186a. On the other hand, the AND circuit 187a generates a low-level timing signal SW0 if the waveform distortion is not detected (if either the timing signal SW outputted from the timing generation circuit 184a or the waveform distortion detection signal DT outputted from the waveform distortion detection circuit 186a is low-level), on the basis of the output of each of the timing generation circuit 184a and the waveform distortion detection circuit 186a. In other words, in the first modified example, the waveform distortion is corrected selectively when the waveform distortion is detected.

If the high-level timing signal SW0 is outputted from the AND circuit 187a, the selector 185a outputs the predicted minimum value (i.e. −Ref_H) outputted from the PRML signal processing circuit 15 as the distortion-corrected read sample value series $RS_{CAM}$ to the PRML signal processing circuit 15. On the other hand, if the low-level timing signal SW0 is outputted from the AND circuit 187a, the selector 185a outputs the read sample value series $RS_C$ outputted from the delay adjustment circuit 181a as the distortion-corrected read sample value series $RS_{CAM}$ to the PRML signal processing circuit 15.

As shown in FIG. 11, the waveform distortion detection circuit 186a is provided with a shift register 1831a, a selector 1832a, a maximum value detection circuit 1833a, a minimum value detection circuit 1834a, a subtracter 1835a, and a judgment circuit 1836a.

The read sample value series $RS_C$ inputted to the waveform distortion detection circuit 186a is outputted to the shift register 1831a. The shift register 1831a outputs the inputted read sample value series $RS_C$ to the selector 1832a as outputs D0 to D14 while shifting the inputted read sample value series $RS_C$ by one clock.

The selector 1832a selectively samples and holds three outputs from among the outputs D0 to D14, on the basis of the mark/space length, in timing outputted from the mark/space length detection circuit 183a, and outputs the three outputs to the maximum value detection circuit 1833a and the minimum value detection circuit 1834a, respectively.

More specifically, the selector 1832a selectively samples and holds three outputs D2, D3, and D4 from among the outputs D0 to D14 if the mark/space length outputted from the mark/space length detection circuit 183a is 6T, and outputs the three outputs to the maximum value detection circuit 1833a and the minimum value detection circuit 1834a, respectively. The selector 1832a selectively samples and holds three outputs D2, D3, and D5 from among the outputs D0 to D14 if the mark/space length outputted from the mark/space length detection circuit 183a is 7T, and outputs the three outputs to the maximum value detection circuit 1833a and the minimum value detection circuit 1834a, respectively. The selector 1832a selectively samples and holds three outputs D2, D4, and D6 from among the outputs D0 to D14 if the mark/space length outputted from the mark/space length detection circuit 183a is 8T, and outputs the three outputs to the maximum value detection circuit 1833a and the minimum value detection circuit 1834a, respectively. The selector 1832a selectively samples and holds three outputs D2, D4, and D7 from among the outputs D0 to D14 if the mark/space length outputted from the mark/space length detection circuit 183a is 9T, and outputs the three outputs to the maximum value detection circuit 1833a and the minimum value detection circuit 1834a, respectively. The selector 1832a selectively samples and holds three outputs D2, D5, and D8 from among the outputs D0 to D14 if the mark/space length outputted from the mark/space length detection circuit 183a is 10T, and outputs the three outputs to the maximum value detection circuit 1833a and the minimum value detection circuit 1834a, respectively. The selector 1832a selectively samples and holds three outputs D2, D5, and D9 from among the outputs D0 to D14 if the mark/space length outputted from the mark/space length detection circuit 183a is 11T, and outputs the three outputs to the maximum value detection circuit 1833a, and the minimum value detection circuit 1834a, respectively The selector 1832a selectively samples and holds three outputs D2, D7, and D12 from among the outputs D0 to D14 if the mark/space length outputted from the mark/space length detection circuit 183a is 14T, and outputs the three outputs to the maximum value detection circuit 1833a, and the minimum value detection circuit 1834a, respectively. The operation of the selector 1832a described above substantially corresponds to the operation of selectively outputting the signal level in the front edge portion, the signal level in the middle portion, and the signal level in the rear edge portion of the waveform distortion, shown in FIG. 2(*a*) to FIG. 2(*c*) and FIG. 3(*a*) to FIG. 3(*c*).

Then, on the maximum value detection circuit 1833a, the maximum value (i.e. the maximum signal level) of the three outputs outputted from the selector 1832a is detected, and the detected maximum value is outputted to the subtracter 1835a.

Moreover, on the minimum value detection circuit 1834a, the minimum value (i.e. the minimum signal level) of the three outputs outputted from the selector 1832a is detected, and the detected minimum value is outputted to the subtracter 1835a.

Then, on the subtracter 1835a, the minimum value detected on the minimum value detection circuit 1834a is subtracted from the maximum value detected on the maximum value detection circuit 1833a, by which the waveform distortion amount D is calculated.

Then, on the judgment circuit 1836a, it is judged whether or not the waveform distortion amount outputted from the subtracter 1835a is greater than or equal to a predetermined value x. If the waveform distortion amount D is relatively small, the waveform distortion is not regarded as being detected, and the low-level waveform distortion detection signal DT is outputted. On the other hand, if the waveform distortion amount D is relatively large (e.g. if the waveform distortion ratio is greater than or equal to approximately 30%), the waveform distortion is regarded as being detected, and the high-level waveform distortion detection signal. DT is outputted.

In a flow of operations at this time, as shown in FIG. 12, firstly, the operation of reproducing data recorded on the optical disc 100 is performed (step S101). In the reproduction operation, it is judged whether or not the read signal $R_{RF}$ satisfies a desired reproduction property (step S102).

As a result of the judgment in the step S102, if it is judged that the read signal $R_{RF}$ satisfies the desired reproduction property (the step S102: Yes), the operational flow goes to a step S107.

On the other hand, as a result of the judgment in the step S102, if it is judged that the read signal $R_{RF}$ does not satisfy the desired reproduction property (the step S102: No), then it is judged whether or not the waveform distortion is actually detected on the waveform distortion detection circuit 186a (step S201).

As a result of the judgment in the step S201, if it is judged that the waveform distortion is not actually detected on the waveform distortion detection circuit 186a (the step S201: No), the operational flow goes to the step S107 without correcting the waveform distortion (i.e. without performing the operations in the step S103 to the step S106).

On the other hand, as a result of the judgment in the step S201, if it is judged that the waveform distortion is detected (the step S201: Yes), the operational flow goes to the step S107 after correcting the waveform distortion (i.e. after performing the operations in the step S103 to the step S106).

As described above, by selectively correcting the waveform distortion when the waveform distortion is detected, it is possible to receive the aforementioned various effects while reducing the load of the information reproducing apparatus 1a.

In addition, the waveform distortion is selectively corrected by the waveform distortion correction circuit 18 when the waveform distortion actually occurs. Here, in particular, as opposed to the optical disc 100 which allows only sequential recording, various recording statuses are mixed in the optical disc 100 which allows random recording. In this case, it is necessary to read the read signal $R_{RF}$ in which the waveform distortion is discontinuously or discretely distributed or not distributed, or to read the read signal. $R_{RF}$ which has various signal levels. Therefore, by reproducing the record data without correcting the waveform distortion in a normal case, and by reproducing the record data while selectively correcting the waveform distortion in the case where the waveform distortion actually occurs, it is possible to receive the aforementioned various effects while reducing the load of the information reproducing apparatus 1.

(4-2) Second Modified Example

Firstly, with reference to FIG. 13 to FIG. 17, an information reproducing apparatus 1b in a second modified example will be described. FIG. 13 is a timing chart conceptually showing an operation of correcting the waveform distortion by the information reproducing apparatus 1b in the second modified example, on a first read signal $R_{RF}$. FIG. 14 is a timing chart conceptually showing the operation of correcting the waveform distortion by the information reproducing apparatus 1b in the second modified example, on a second read signal $R_{RF}$. FIG. 15 is a flowchart conceptually showing a first flow of operations by the information reproducing apparatus 1b in the second modified example. FIG. 16 is a flowchart conceptually showing a second flow of operations by the information reproducing apparatus 1b in the second modified example. FIG. 17 is a flowchart conceptually showing a third flow of operations by the information reproducing apparatus 1b in the second modified example.

The record data recorded on the optical disc 100 includes not only normal user data but also the synchronization data (e.g. the record data with a run length of 14T if the optical disc 100 is a DVD, and the record data with a run length of 9T if the optical disc 100 is a Blue-ray Disc) used for synchronization in reproducing the user data. In the second modified example, considering that the synchronization data is included in the record data, the correction of the waveform distortion may be limited to the synchronization data.

More specifically, as shown in FIG. 13, if the optical disc 100 is a Blu-ray Disc, since the synchronization data is formed of a 9T mark and a 9T space, firstly, the 9T space is detected, and the waveform distortion before or after the detected 9T space may be corrected. Moreover, focusing on periodicity that the synchronization data appears, the waveform distortion may be corrected near a position being shifted by a time corresponding to 1932T (or 1932T±α1: α1 is a predetermined constant) from the detected 9T space toward the advancing direction (or a position being shifted by β1T from the relevant position toward the advancing direction: β1 is a predetermined constant).

Moreover, as shown in FIG. 14, if the optical disc 100 is a DVD, since the synchronization data is a 14T mark or a 14T space, firstly, the 14T space is detected, and the waveform distortion may be corrected near a position being shifted by a time corresponding to 1488T (or 1488T±α2: α2 is a predetermined constant) from the detected 14T space toward the advancing direction (or a position being shifted by β2T from the relevant position toward the advancing direction: β2 is a predetermined constant).

A flow of the operations if the optical disc 100 is a Blu-ray Disc (a first operational flow) will be described, with reference to FIG. 1

As shown in FIG. 15, firstly, the operation of reproducing data recorded on the optical disc 100 is performed (step S101).

In the reproduction operation, it is judged whether or not the 9T space is detected (step S401).

As a result of the judgment in the step S401, if it is judged that the 9T space is not detected (the step S401: No), the operational flow returns to the step S401 again, and the judgment operation of whether or not the 9T space is detected is repeated.

On the other hand, as a result of the judgment in the step S401, if it is judged that the 9T space is detected (the step S401: Yes), then, it is judged whether or not the record data (in other words, the read signal $R_{RF}$) immediately before or immediately after the 9T space is the 9T mark (step S402).

As a result of the judgment in the step S402, if it is judged that the record data immediately before or immediately after the 9T space is the 9T mark (the step S402: Yes), the operations are ended without change.

On the other hand, as a result of the judgment in the step S402, if it is judged that the record data immediately before or immediately after the 9T space is not the 9T mark (the step S402: No), the waveform distortion immediately before or immediately after the 9T space or near the both positions is corrected (step S404). The correction of the waveform distortion in the step S404 is performed in the same manner as the operations in the step S103 to the step 106 in FIG. 4.

Next, another flow of the operations if the optical disc 100 is a Blu-ray Disc (a second operational flow) will be described, with reference to FIG. 16.

As shown in FIG. 16, firstly, the operation of reproducing data recorded on the optical disc 100 is performed (step S101).

In the reproduction operation, it is judged whether or not the 9T space is detected (step S401).

As a result of the judgment in the step S401, if it is judged that the 9T space is not detected (the step S401: No), the operational flow returns to the step S401 again, and the judgment operation of whether or not the 9T space is detected is repeated.

On the other hand, as a result of the judgment in the step S401, if it is judged that the 9T space is detected (the step S401: Yes), then, it is judged whether or not the record data at a position being shifted by a time corresponding to 1932T (or 1932±α1) from the detected 9T space toward the advancing direction (or a position being shifted by β1T from the relevant position toward the advancing direction) is the 9T mark (step S502).

As a result of the judgment in the step S502, if it is judged that the record data at the position being shifted by the time corresponding to 1932T (or 1932±α1) from the detected 9T space toward the advancing direction (or the position being shifted by β1T from the relevant position toward the advancing direction) is the 9T mark (the step S502: Yes), the operations are ended without change.

On the other hand, as a result of the judgment in the step S502, if it is judged that the record data at the position being shifted by the time corresponding to 1932T (or 1932±α1) from the detected 9T space toward the advancing direction (or the position being shifted by β1T from the relevant position toward the advancing direction) is not the 9T mark (the step S502: No), the waveform distortion is corrected near the position being shifted by the time corresponding to 1932T (or 1932±α1) from the detected 9T space toward the advancing direction (or the position being shifted by β1T from the relevant position toward the advancing direction) (step S504).

Next, a flow of the operations if the optical disc 100 is a DVD (a third operational flow) will be described, with reference to FIG. 17.

As shown in FIG. 17, firstly, the operation of reproducing data recorded on the optical disc 100 is performed (step S101).

In the reproduction operation, it is judged whether or not the 14T space is detected (step S601).

As a result of the judgment in the step S601, if it is judged that the 14T space is not detected (the step S601: No), the operational flow returns to the step S601 again, and the judgment operation of whether or not the 14T space is detected is repeated.

On the other hand, as a result of the judgment in the step S601, if it is judged that the 14T space is detected (the step S601 Yes), then, it is judged whether or not the read signal $R_{RF}$ at a position being shifted by a time corresponding to 1488T (or 1488±α2) from the detected 14T space toward the advancing direction (or a position being shifted by β2T from the relevant position toward the advancing direction) is the 14T mark or the 14T space (step S602).

As a result of the judgment in the step S602, if it is judged that the read signal $R_{RF}$ at the position being shifted by the time corresponding to 1488T (or 1488±α2) from the detected 14T space toward the advancing direction (or a position being shifted by β2T from the relevant position toward the advancing direction) is the 14T mark or the 14T space (the step S602: Yes), the operations are ended without change.

On the other hand, as a result of the judgment in the step S602, if it is judged that the read signal $R_{RF}$ at the position being shifted by the time corresponding to 1488T (or 1488±α2) from the detected 14T space toward the advancing direction (or a position being shifted by β2T from the relevant position toward the advancing direction) is not the 14T mark or the 14T space (the step S602: No), the waveform distortion is corrected near the position being shifted by the time corresponding to 1488T (or 1488±α2) from the detected 14T space toward the advancing direction (or a position being shifted by β2T from the relevant position toward the advancing direction) (step S604). The correction of the waveform distortion in the step S604 is performed in the same manner as the operations in the step S103 to the step 106 in FIG. 4.

As described above, by correcting the waveform distortion in view of that the synchronization data is included in the record data, it is possible to preferably perform the high-frequency emphasis on the synchronization data which is more important than the user data, resulting in the preferable reproduction of the synchronization data. This can further increase the stability of the reproduction operation.

(5) Influence on Path Metric Calculation in PR (1, 2, 2, 1) Method

Next, in the PR (1, 2, 2, 1) method explained with reference to FIG. 6, an influence of the waveform distortion with respect to the path metric calculation in the PRML process will be described, for reference, with reference to FIG. 18 to FIG. 20. FIG. 18 are a state transition diagram in the PR (1, 2, 2, 1) method and a trellis diagram obtained by developing the state transition diagram in a time axis direction. FIG. 19 is a waveform diagram conceptually showing the operation of correcting the waveform distortion, on the sample value series $RS_C$, the operation being aimed at sample values included in a range between a sample value located two after a first zero cross point and a sample value located two before a second zero cross point, if the PR (1, 2, 2, 1) method is applied. FIG. 20 is a waveform diagram conceptually showing the operation of correcting the waveform distortion, on the sample value series $RS_C$, the operation being aimed at sample values included in a range between a sample value located one after the first zero cross point and a sample value located one before the second zero cross point, if the PR (1, 2, 2, 1) method is applied.

Incidentally; in the explanation in FIG. 18 to FIG. 20, a Blu-ray Disc is used as one specific example of the optical disc 100.

If the data pattern of the record data on the optical disc 100 is expressed by three bits which are continuous with respect to a time axis (i.e. expressed by NRZI), the data is shown by six types of data patterns of (0, 0, 0), (0, 0, 1), (1, 0, 0), (0, 1, 1), (1, 1, 0), and (1, 1, 1). Incidentally, here, the bit on the right side is a new bit on the time axis (i.e. the newest input bit). In the state transition diagram in FIG. 18(a) and the trellis diagram in FIG. 18(b), the six types of data patterns are defined as follows: (0, 0, 0) is defined as S000, (0, 0, 1) is defined as S001, (1, 0, 0) is defined as S100, (0, 1, 1) is defined as S011, (1, 1, 0) is defined as S110, and (1, 1, 1) is defined as S111. Here, in a Blu-ray Disc, the mark/space with the shortest run length has a mark/space length of 2T, there are no data patterns of (1, 0, 1) and (0, 1, 0). Therefore, the data pattern of (0, 0, 1) can be transit only to the data pattern of (0, 1, 1), and the data pattern of (1, 1, 0) can be transit only to the data pattern of (1, 0, 0). In other words, S001 is limited to the state transition to S011, and S110 is limited to the state transition to S100. Thus, the state transition diagram in the code state of the record data on the optical disc 100 and the trellis diagram are as shown in FIG. 18(a) and FIG. 18(b), respectively.

An Euclidean distance between the sample value S(k) of the read signal on which partial-response-equalization using the PR (1, 2, 2, 1) method is performed and ideal sample values in the PR (1, 2, 2, 1) method is referred to as a branch metric (i.e. probability in the state transition at each time point k). The branch metric is accumulated in a series of routes (paths), thus providing a path metric. The ideal sample values in the PR (1, 2, 2, 1) method are the seven values of Ref_H, Ref_M, Ref_L, ZL, –Ref_L, –Ref_M, and –Ref_H, as shown using FIG. 6.

Here, the path metric value of the state S000(k) at the time point k is defined PM000(k). The path metric value of the state S001(k) at the time point k is defined PM001(k). The path metric value of the state S100(k) at the time point k is defined PM100(k). The path metric value of the state S011(k) at the time point k is defined PM011(k). The path metric value of the state S110(k) at the time point k is defined PM110(k). The path metric value of the state S111(k) at the time point k is defined PM111(k). At this time, each of PM000(k), PM001(k), PM100(k), PM011(k), PM110(k), and PM111(k) is expressed as follows.

$$PM111(k)=\min(PM111(k-1)+(S(k)-\text{Ref\_}H)^2, PM011(k-1)+(S(k)-\text{Ref\_}M)^2)$$

$$PM110(k)=\min(PM111(k-1)+(S(k)-\text{Ref\_}M)^2, PM011(k-1)+(S(k)-\text{Ref\_}L)^2)$$

$$PM011(k)=PM001(k-1)+(S(k)-ZL)^2$$

$$PM100(k)=PM110(k-1)+(S(k)-ZL)^2$$

$$PM001(k)=\min(PM000(k-1)+(S(k)+\text{Ref\_}M)^2, PM100(k-1)+(S(k)+\text{Ref\_}L)^2)$$

$$PM000(k)=\min(PM000(k-1)+(S(k)+\text{Ref\_}H)^2, PM100(k-1)+(S(k)+\text{Ref\_}M)^2),$$

wherein min(A, B) here is assumed to such a function that A is outputted if A≦B and that B is outputted if A>B. In the trellis diagram shown in FIG. 18(b), on branches crossing in the state at the time point k, the branch having a smaller path metric value is selected (in other words, merged). For example, in the state S000(k) at the time point k, a branch a from S100(k–1) and a branch b from S000(k–1) cross each other. Here, a path metric value a_pm of the branch a and a path metric value b_pm of the branch b are as follows.

$$a\_pm=PM000(k-1)+(S(k)+\text{Ref\_}H)^2$$

$$b\_pm=PM100(k-1)+(S(k)+\text{Ref\_}M)^2$$

The branch a is the branch metric when 0 is newly inputted next to the data pattern (0, 0, 0). Thus, the path metric value is calculated from the square of a difference between S(k) and –Ref_H. For the data patterns at a time point k–1 of the branch a, there are two considerable data patterns: (0, 0, 0, 0) and (1, 0, 0, 0). Thus, the path of the branch a from the time point k–1 to the time point k is either a1 or a2 in FIG. 19.

The branch b is the branch metric when 0 is newly inputted next to the data pattern (1, 0, 0). Thus, the path metric value is calculated from the square of a difference between S(k) and –Ref_M. Considering the restriction that in a Blu-ray Disc, the mark/space with the shortest run length in a Blu-ray Disc has a mark/space length of 2T, the data pattern at the time point k–1 of the branch b is (1, 1, 0, 0). If the calculation in the PR (1, 2, 2, 1) method is performed on this data pattern, 1×1+1×2+0×2+0×1=3. Since an all T center level is set to ZL (zero level), 3=ZL. Therefore, the path of the branch b from the time point k–1 to the time point k is a path starting from ZL, as shown as b in FIG. 19.

In FIG. 19, S(k) is the path that it is correct to be –Ref_M, and S(k+1) to S(k+5) are the paths that they are correct to be e –Ref_H. Thus, as described above, if the waveform distortion is corrected from the sample value S(k+1) located two after the first zero cross point, the path metric value of the branch b (i.e. a value obtained by squaring the difference between S(k) and –Ref_M) is less than the path metric value of the branch a (i.e. (i.e. a value obtained by squaring the difference between S(k) and −Ref_H), so that a probability of selecting the path of the branch b is higher.

On the other hand, as shown in FIG. 20, if the waveform distortion is corrected from the sample value S(k) located one after the first zero cross point, the path metric value of the branch a is less than the path metric value of the branch b, so that a probability of selecting the path of the branch a is higher. This is not preferable due to the higher probability that the mark length after binarization by the PRML process is longer than the original mark length. Therefore, in order not to have an adverse effect on the PRML process, if the PRML (1, 2, 2, 1) method is adopted, the operation of correcting the waveform distortion is preferably performed, aimed at the sample values included in the range between the sample value located two after the first zero cross point and the sample value located two before the second zero cross point, as described above.

Incidentally, FIG. 18 to FIG. 20 explains the example in the PR (1, 2, 2, 1) method; however, obviously, the same explanation can be applied in each method other than the PR (1, 2, 2, 1) method (e.g. a PR (C1, C21, C22, . . . , C2k, C1) method). This results in the conclusion that, in the PR (C1, C21, C22, . . . , C2k, C1) method), it is preferable to performed the operation of correcting the waveform distortion, aimed at ample values included in the range between the sample value located (k+1)/2 after the first zero cross point and the sample value located (k+1)/2 before the second zero cross point, as described above.

Incidentally, the waveform distortion occurs generally due to the dispersion of the shape, length, and the like of the marks formed on the recording surface of the optical disc 100. Therefore, the waveform distortion tends to occur in the recording type optical disc 100, such as a DVD-R/RW, a DVD+R/RW, a DVD-RAM and a BD-R/RE. However, even in the read-only type optical disc 100, such as a DVD-ROM and a BD-ROM, the waveform distortion occurs if the synchronization data formed of the relatively long mark is adjacent to each other in a tracking direction, as shown in FIG. 21. For the waveform distortion occurring in the read-only type optical disc 100, according to the information reproducing apparatus 1 described above, the correction can be preferably made, obviously.

The present invention is not limited to the aforementioned example, but various changes may be made, if desired, without departing from the essence or spirit of the invention which can be read from the claims and the entire specification. An information reproducing apparatus and method, and a computer program, all of which involve such changes, are also intended to be within the technical scope of the present invention.

The invention claimed is:

1. An information reproducing apparatus, comprising:
  a correcting device for correcting waveform distortion occurring in a read signal corresponding to at least a long mark, of a read signal read from a recording medium; and
  a processing device for performing a PRML (Partial Response Maximum Likelihood) process on the read signal in which the waveform distortion is corrected, wherein
  said correcting device corrects the waveform distortion occurring in the read signal corresponding to synchronization data, the synchronization data being used to read user data included in record data, the synchronization data being included in the record data, and said correcting device corrects the waveform distortion at least one of i) before a space which makes a pair with a mark which constitutes the synchronization data of the read signal, ii) after the space, and iii) at a position which satisfies periodicity of the synchronization data with a base point at the space.

2. The information reproducing apparatus according to claim 1, wherein if the waveform distortion occurs in a direction that a signal level increases, said correcting device corrects the waveform distortion by correcting a signal component of the read signal which is less than or equal to a reference level and which is in a range that does not mislead a path metric selection in the PRML process.

3. The information reproducing apparatus according to claim 1, wherein if the waveform distortion occurs in a direction that a signal level reduces, said correcting device corrects the waveform distortion by correcting a signal component of the read signal which is greater than or equal to a reference level and which is in a range that does not mislead a path metric selection in the PRML process.

4. The information reproducing apparatus according to claim 1, wherein if said processing device adopts a PR (C1, C21, C22, . . . , C2k, C1) method, said correcting device corrects the waveform distortion by correcting a signal component between a sample value which appears (k+1)/2 after a first reference cross point and a sample value which appears (k+1)/2 before a second reference cross point located next to the first reference cross point.

5. The information reproducing apparatus according to claim 1, wherein if said processing device adopts a PR (1, 2, 1) method, said correcting device corrects the waveform distortion by correcting a signal component between a sample value which appears one after a first reference cross point and a sample value which appears one before a second reference cross point located next to the first reference cross point.

6. The information reproducing apparatus according to claim 1, wherein if said processing device adopts a PR (1, 2, 2, 1) method, said correcting device corrects the waveform distortion by correcting a signal component between a sample value which appears two after a first reference cross point and a sample value which appears two before a second reference cross point located next to the first reference cross point.

7. The information reproducing apparatus according to claim 1, wherein if said processing device adopts a PR (1, 2, 2, 2, 1) method, said correcting device corrects the waveform distortion by correcting a signal component between a sample value which appears two after a first reference cross point and a sample value which appears two before a second reference cross point located next to the first reference cross point.

8. The information reproducing apparatus according to claim 1, wherein if said processing device adopts a PR (1, 2, 2, 2, 2, 1) method, said correcting device corrects the waveform distortion by correcting a signal component between a sample value which appears three after a first reference cross point and a sample value which appears three before a second reference cross point located next to the first reference cross point.

9. The information reproducing apparatus according to claim 1, wherein if the waveform distortion occurs in a direction that a signal level increases, said correcting device corrects the signal level of the waveform distortion to a predicated minimum value in the PRML process.

10. The information reproducing apparatus according to claim 1, wherein if the waveform distortion occurs in a direction that a signal level reduces, said correcting device corrects the signal level of the waveform distortion to a predicated maximum value in the PRML process.

11. The information reproducing apparatus according to claim 1, further comprising a detecting device for detecting the waveform distortion,
   said correcting device correcting the waveform distortion if the waveform distortion is detected by said detecting device.

12. The information reproducing apparatus according to claim 1, wherein said correcting device corrects the waveform distortion (i) if an error correction of the read signal cannot be performed, (ii) if an error rate of the read signal is greater than or equal to a predetermined threshold value, or (iii) if a read signal corresponding to synchronization data cannot be read, the synchronization data being used to read user data included in record data, the synchronization data being included in the record data.

13. The information reproducing apparatus according to claim 1, wherein the long mark is a mark whose signal level is maximum amplitude.

14. The information reproducing apparatus according to claim 1, wherein said processing device comprises:
   an equalizing device for partial-response equalizing the read signal on the basis of intentional waveform interference which can limit an area frequency component included in the read signal; and
   a Maximum Likelihood decoding device for estimating a most probable series with respect to an output of said equalizing device.

15. An information reproducing method, comprising:
   a correcting process of correcting waveform distortion occurring in a read signal corresponding to at least a long mark, of a read signal read from a recording medium; and
   a processing process of performing a PRML (Partial Response Maximum Likelihood) process on the read signal in which the waveform distortion is corrected, wherein
   said correcting process corrects the waveform distortion occurring in the read signal corresponding to synchronization data, the synchronization data being used to read user data included in record data, the synchronization data being included in the record data, and
   said correcting process corrects the waveform distortion at least one of i) before a space which makes a pair with a mark which constitutes the synchronization data of the read signal, ii) after the space, and iii) at a position which satisfies periodicity of the synchronization data with a base point at the space.

16. A computer readable recording medium recording thereon a computer program for reproduction control and for controlling a computer provided in an information reproducing apparatus, comprising: a correcting device for correcting waveform distortion occurring in a read signal corresponding to at least a long mark, of a read signal read from a recording medium; and a processing device for performing a PRML (Partial Response Maximum Likelihood) process on the read signal in which the waveform distortion is corrected, wherein said correcting device corrects the waveform distortion occurring in the read signal corresponding to synchronization data, the synchronization data being used to read user data included in record data, the synchronization data being included in the record data, and said correcting device corrects the waveform distortion at least one of i) before a space which makes a pair with a mark which constitutes the synchronization data of the read signal, iii) after the space, and iii) at a position which satisfies periodicity of the synchronization data with a base point at the space,
   said computer program making the computer function as at least one portion of said correcting device and said processing device.

* * * * *